(12) United States Patent
Saito et al.

(10) Patent No.: US 11,066,758 B2
(45) Date of Patent: Jul. 20, 2021

(54) RESIN POWDER HAVING PILLAR SHAPE AND SPECIFIC CIRCULARITY FOR SOLID FREEFORM FABRICATION, DEVICE FOR SOLID FREEFORM FABRICATION OBJECT, AND METHOD OF MANUFACTURING SOLID FREEFORM FABRICATION OBJECT

(71) Applicants: Akira Saito, Kanagawa (JP); Shigenori Yaguchi, Tokyo (JP); Yasuyuki Yamashita, Kanagawa (JP); Kiichi Kamoda, Kanagawa (JP); Yasuo Suzuki, Shizuoka (JP); Nozomu Tamoto, Shizuoka (JP); Hitoshi Iwatsuki, Kanagawa (JP); Shinzo Higuchi, Tokyo (JP); Sohichiroh Iida, Kanagawa (JP)

(72) Inventors: Akira Saito, Kanagawa (JP); Shigenori Yaguchi, Tokyo (JP); Yasuyuki Yamashita, Kanagawa (JP); Kiichi Kamoda, Kanagawa (JP); Yasuo Suzuki, Shizuoka (JP); Nozomu Tamoto, Shizuoka (JP); Hitoshi Iwatsuki, Kanagawa (JP); Shinzo Higuchi, Tokyo (JP); Sohichiroh Iida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 685 days.

(21) Appl. No.: 15/656,214

(22) Filed: Jul. 21, 2017

(65) Prior Publication Data

US 2018/0023219 A1   Jan. 25, 2018

(30) Foreign Application Priority Data

Jul. 22, 2016  (JP) .............................. JP2016-144869
Mar. 14, 2017  (JP) .............................. JP2017-049026

(Continued)

(51) Int. Cl.
 *B32B 5/16*   (2006.01)
 *D01F 6/66*   (2006.01)
 (Continued)

(52) U.S. Cl.
 CPC ............... *D01F 6/665* (2013.01); *B05D 3/06* (2013.01); *B33Y 70/00* (2014.12); *C08J 3/12* (2013.01);
 (Continued)

(58) Field of Classification Search
 CPC ....... B33Y 10/00; B33Y 70/00; B29C 64/153; B29B 2009/166; Y10T 428/2982
 See application file for complete search history.

(56) References Cited

U.S. PATENT DOCUMENTS 5,527,877 A    6/1996  Dickens, Jr. et al.
6,531,086 B1   3/2003  Larsson
(Continued)

FOREIGN PATENT DOCUMENTS

EP   1 634 693 A1   3/2006
EP   2 177 557 A1   4/2010
(Continued)

OTHER PUBLICATIONS

Office Action dated May 7, 2019 in Japanese Patent No. 6399165.
(Continued)

*Primary Examiner* — Hoa (Holly) Le
(74) *Attorney, Agent, or Firm* — Oblon, McClelland, Maier & Neustadt, L.L.P.

(57) ABSTRACT

A resin powder for solid freeform fabrication includes a particle having a pillar-like form, wherein the ratio of the height of the particle to the diameter or the long side of the bottom of the particle is 0.5 to 2.0, the particle has a 50 percent cumulative volume particle diameter of from 5 to 200 μm, and the ratio (Mv/Mn) of the volume average (Continued)

particle diameter (Mv) to the number average particle diameter (Mn) of the particle is 2.00 or less.

17 Claims, 3 Drawing Sheets

(30) Foreign Application Priority Data

Jun. 6, 2017 (JP) .............................. JP2017-111489
Jul. 14, 2017 (JP) .............................. JP2017-138273

(51) Int. Cl.

| | | |
|---|---|---|
| C08J 3/12 | (2006.01) | |
| B33Y 70/00 | (2020.01) | |
| C08K 3/04 | (2006.01) | |
| B05D 3/06 | (2006.01) | |
| C08K 3/16 | (2006.01) | |
| C08K 3/22 | (2006.01) | |
| C08K 5/1575 | (2006.01) | |
| C08K 5/527 | (2006.01) | |
| C08K 7/14 | (2006.01) | |
| C08K 7/20 | (2006.01) | |
| D01F 1/07 | (2006.01) | |
| D01F 1/10 | (2006.01) | |
| D01F 6/06 | (2006.01) | |
| D01F 6/80 | (2006.01) | |
| D01F 6/84 | (2006.01) | |

(52) U.S. Cl.
CPC ............... *C08K 3/046* (2017.05); *C08K 3/16* (2013.01); *C08K 3/2279* (2013.01); *C08K 5/1575* (2013.01); *C08K 5/527* (2013.01); *C08K 7/14* (2013.01); *C08K 7/20* (2013.01); *D01F 1/07* (2013.01); *D01F 1/10* (2013.01); *D01F 6/06* (2013.01); *D01F 6/66* (2013.01); *D01F 6/80* (2013.01); *D01F 6/84* (2013.01); *C08J 2323/12* (2013.01); *C08J 2329/14* (2013.01); *C08J 2367/02* (2013.01); *C08J 2371/00* (2013.01); *C08J 2377/06* (2013.01); *Y10T 428/2982* (2015.01)

(56) References Cited

U.S. PATENT DOCUMENTS

| | | | |
|---|---|---|---|
| 2007/0290410 A1 | 12/2007 | Koo et al. | |
| 2008/0152910 A1* | 6/2008 | Hesse | B22F 1/0048 428/402 |
| 2011/0129682 A1 | 6/2011 | Kurata et al. | |
| 2011/0172387 A1 | 7/2011 | Filou et al. | |
| 2011/0293918 A1 | 12/2011 | Lucas et al. | |
| 2013/0052453 A1 | 2/2013 | Filou et al. | |
| 2013/0307196 A1 | 11/2013 | Corriol et al. | |
| 2015/0259247 A1 | 9/2015 | Watanabe | |
| 2015/0336292 A1* | 11/2015 | Mikulak | B29B 9/06 428/402 |
| 2016/0038633 A1* | 2/2016 | Watanabe | C04B 35/447 428/402.24 |
| 2018/0022024 A1* | 1/2018 | Saito | B29B 9/16 264/482 |
| 2018/0264720 A1* | 9/2018 | Tamoto | C08K 5/13 |
| 2020/0079011 A1* | 3/2020 | Iwatsuki | B29B 9/16 |

FOREIGN PATENT DOCUMENTS

| | | |
|---|---|---|
| JP | 11-080413 | 3/1999 |
| JP | 2003-246864 A | 9/2003 |
| JP | 2005-325465 | 11/2005 |
| JP | 2006-321771 A | 11/2006 |
| JP | 2009-013395 | 1/2009 |
| JP | 2012-081765 | 4/2012 |
| JP | 2013-529599 | 7/2013 |
| JP | 2014-522331 | 9/2014 |
| JP | 2015-500375 A | 1/2015 |
| JP | 2015-515434 | 5/2015 |
| JP | 2018-523718 A | 8/2018 |
| WO | WO2004/003823 A1 | 1/2004 |
| WO | WO2006/020279 A2 | 2/2006 |
| WO | WO 2008/036071 A2 | 3/2008 |
| WO | WO 2008/036071 A3 | 3/2008 |
| WO | WO2008/057844 A1 | 5/2008 |
| WO | WO2011/156602 A2 | 12/2011 |
| WO | WO2012/164078 A2 | 12/2012 |
| WO | WO2013/130553 A1 | 9/2013 |
| WO | WO 2013/138204 A1 | 9/2013 |
| WO | WO 2016/084928 A1 | 6/2016 |

OTHER PUBLICATIONS

Office Action dated Jun. 14, 2019 in Japanese Patent No. 6399165, citing documents AO-AS and AX therein, 45 pages (with partial English translation).

"Unabridged Dictionary of Chemistry 8" Unabridged Dictionary of Chemistry Editorial Committee, 2006, 5 pages.

Office Action dated May 22, 2018 in Japanese Patent Application No. 2017-138273.

News Release of 3D printer, "RICOH AM S5500P", RICOH Imagine. Change. Oct. 27, 2015, 2 pages (with partial English translation).

Extended European Search Report dated Dec. 19, 2017 in Patent Application No. 17182431.1 citing references AA-AG and AO-AQ therein, 12 pages.

\* cited by examiner

RESIN POWDER HAVING PILLAR SHAPE AND SPECIFIC CIRCULARITY FOR SOLID FREEFORM FABRICATION, DEVICE FOR SOLID FREEFORM FABRICATION OBJECT, AND METHOD OF MANUFACTURING SOLID FREEFORM FABRICATION OBJECT

CROSS-REFERENCE TO RELATED APPLICATIONS

This patent application is based on and claims priority pursuant to 35 U.S.C. § 119 to Japanese Patent Application Nos. 2016-144869, 2017-049026, 2017-111489, and 2017-138273, filed on Jul. 22, 2016, Mar. 14, 2017, Jun. 6, 2017, and Jul. 14, 2017, respectively, in the Japan Patent Office, the entire disclosures of which are hereby incorporated by reference herein.

BACKGROUND

Technical Field

The present invention relates to a resin powder for solid freeform fabrication, a device for manufacturing a solid freeform fabrication object, and a method of manufacturing a solid freeform fabrication object.

Description of the Related Art

Powder bed fusion (PBF) methods include a selective laser sintering (SLS) method of forming a solid freeform fabrication object by selective irradiation and a selective mask sintering (SMS) method of applying laser beams in planar form using a mask.

A device employing the PBF method selectively irradiates a thin layer of powder of metal, ceramics, or resin with laser beams to melt and attach the powder to each other to form a layer thereof and repeats this operation to laminate layers to obtain a solid freeform fabrication object (3D object).

In the case of resin powder for the PBF method, while maintaining inner stress between the thin layers low and relaxing the stress, the layers of the resin powder supplied to a supply ink are heated to temperatures close to the softening point of the resin. Thereafter, the heated layer is selectively irradiated with laser beams to raise the temperature of the resin powder to the softening point or higher so that the resin powder is fused and attached to each other to conduct solid freeform fabrication.

Currently, polyamide resins are commonly used in PBF method. In particular, polyamide 12 is suitably used because it has a relatively low melting point among polyamides, incurs less heat contraction, and has poor water absorbency.

Demands for making not only prototypes but also products have been increasing so that expectations of research and development and launching of various types of resins suitable for PBF methods haven been rising.

SUMMARY

According to an embodiment of the present disclosure, provided is an improved resin powder for solid freeform fabrication, which includes a particle having a pillar-like form, wherein the ratio of the height of the particle to the diameter or the long side of the bottom of the particle is 0.5 to 2.0, the particle has a 50 percent cumulative volume particle diameter of from 5 to 200 μm, and the ratio (Mv/Mn) of the volume average particle diameter (Mv) to the number average particle diameter (Mn) of the particle is 2.00 or less.

BRIEF DESCRIPTION OF THE SEVERAL VIEWS OF THE DRAWINGS

Various other objects, features and attendant advantages of the present disclosure will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1A:
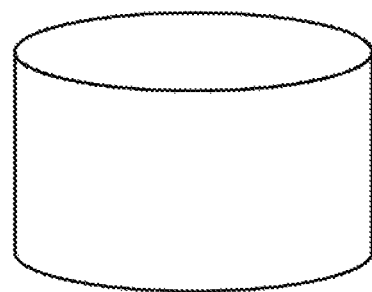
FIG. 1A is a diagram illustrating a schematic perspective view of an example of a cylindrical form.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Resin Powder for Solid Freeform Fabrication

The resin powder for solid freeform fabrication of the present disclosure includes a particle having a pillar-like form. The ratio of the height of the particle to the diameter or the long side of the bottom of the particle is from 0.5 to 2.0. Also, the particle has a 50 percent cumulative volume particle diameter of from 5 to 200 μm. Moreover, the ratio (Mv/Mn) of the volume average particle diameter (Mv) to the number average particle diameter (Mn) of the particle is 2.00 or less. The resin powder includes furthermore optionally contains other components. The proportion of the particle having pillar-like form to the resin powder for solid freeform fabrication is preferably 30 percent by mass or greater, more preferably 50 percent by mass or greater, furthermore preferably 70 percent by mass or greater, and particularly preferably 90 percent by mass or greater.

When the melting point of the resin powder for solid freeform fabrication as measured according to ISO 3146 is 100 degrees C. or higher, it is preferable because it covers the range of the heat resistance temperature of exteriors of products, etc. The melting point is more preferably 150 degrees C. or higher and particularly preferably 200 degrees C. or higher.

The melting point can be measured according to ISO 3146 (Testing Methods for Transition Temperatures of Plastics, JIS K7121) using a differential scanning calorimeter (DSC). When a plurality of melting points exist, the melting point on the higher temperature side is used.

The specific gravity of the resin powder for solid freeform fabrication is preferably 0.8 g/mL or more. When the specific gravity is 0.8 g/mL or greater, it is preferable because secondary agglomeration of the particles during recoating can be prevented. Conversely, the specific gravity is preferably 3.0 g/mL or less to meet light-weight needs as a substitute of metal. The specific gravity can be obtained by measuring true specific gravity. The true specific gravity is obtained by measuring the density of a sample by measuring the mass thereof from the volume of the sample. The volume is obtained by changing volume and pressure of gas (He gas) at a constant temperature by using a dry-process pycnometer (AccuPyc 1330, manufactured by Shimadzu Corporation) utilizing gas-phase replacement method.

Particle

The particle has a pillar-like form having a ratio of the height of the particle to the diameter or the long side of the bottom of the particle of from 0.5 to 2.0, preferably from 0.7 to 2.0, and more preferably from 0.8 to 1.5.

There is no specific limit to the pillar-like form. It can be suitably selected to suit to a particular application. For example, significantly cylindrical form and cuboid are preferable. Because of the pillar-like form, particles can be packed without a space so that the tensile strength of an obtained solid freeform fabrication object can be enhanced.

The pillar-like form preferably has sides facing each other. The sides facing each other may have an incline. However, they are preferable when they are parallel to each other without an incline in terms of productivity and stability of laser fabrication. The form of the particle can be observed by, for example, scanning electron microscope (S4200, manufactured by Hitachi Ltd.), wet-process particle size and form analyzer (FPIA-3000, manufactured by Sysmex Corporation), etc. Obtained particles may be subject to spheroidizingcal treatment or addition of external additives to improve powder flowability.

Significantly Cylindrical Form

There is no specific limit to the significantly cylindrical form. It can be suitably selected to suit to a particular application. For example, true cylindrical form and cylindroid-like form are preferable. Of these, true cylindrical form is preferable. The circle portion of the significantly cylindrical form may partially chip. In addition, the significantly cylindrical (significantly circular) has a ratio of the major axis to the minor axis of from 1 to 10.

The significantly cylindrical form preferably has significantly circular planes facing each other.

The size of the circles facing each other may not be completely identical but the diameter ratio of the large circle to the small circle is preferably 1.5 or less. More preferably, the ratio is 1.1 or less, meaning if the size is close to each other, particles can be packed more densely.

The diameter of the significantly cylindrical form has no particular limit and can be suitably selected to suit to a particular application. For example, the diameter is preferably from 5 to 200 µm. When the circle portion of the significantly cylindrical form is ellipse, the diameter means the major axis.

The height (distance between both planes) of the significantly cylindrical form has no particular limit and can be suitably selected to suit to a particular application. For example, the height is preferably from 5 to 200 µm.

Cuboid

The cuboid has no specific limit and is suitably selected to suit to a particular application. For example, cuboid and cube are usable. Of these, cube is preferable. The cuboid may partially chip. In terms of narrowing the degree of dispersion to pack particles more densely, cube having equal side length is preferable.

The cuboid preferably has square or rectangle planes facing each other.

Each side of the bottom of the cuboid has no particular limit and can be suitably selected to suit to a particular application. For example, each side is preferably from 5 to 200 µm. The long side of each side is the longest side when one plane is set to be the bottom of a cuboid. When the cuboid is cube, it is one of the sides having an equal length of the bottom.

The height of the cuboid has no particular limit and can be suitably selected to suit to a particular application. For example, each side is preferably from 5 to 200 µm. The height means the direction to the bottom of the cuboid.

In the present disclosure, the side forming the height between planes of the pillar-like form includes crushed state (barrel-like form in the case of pillar-like form) in which the resin softens at cutting. However, space appears between particles having arcs. Therefore, the side is preferably straight in terms of more dense packing of powder. As described above, polygonal columns having a plane pressed against the side of powder have less space at the contact surfaces, which is preferable because powder can be more densely packed.

As the height of the pillar-like form, 50 percent cumulative volume particle diameter is preferably from 5 to 200 µm. In particular, collective entity of powder which is formed close to mono-dispersion is more preferable because it has uniform height with no deviation about the form and size.

In the case of the significantly cylindrical form, it is preferable that the form have a diameter more nearly equal to the height in terms of reproducibility. Similarly, cube having equal height and side is preferable in the case of cuboid.

Figure 1B:
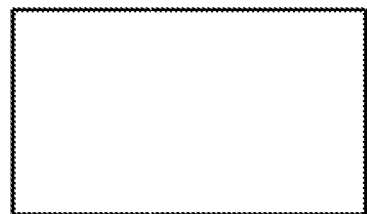
FIG. 1B is a diagram illustrating a side view of the cylindrical form illustrated in FIG. 1A.
Figure 1C:
FIG. 1C is a diagram illustrating a side view of an example of a cylindrical form with no points.

The particle (pillar-like form particle) of the pillar-like form has a pillar-like form having a bottom and a top. Of these, forms having no points at ends are more preferable. The point means an end portion existing in the pillar-like form. For example, FIG. 1B is a side view of the cylindrical form illustrated in FIG. 1A. In this case, the cylindrical form has a rectangular form with four angle portions, i.e., points. FIG. 1C is a diagram illustrating an example of a form without such points. Whether a pillar-like form has a point is confirmed by a projected image of the side plane of the pillar-like form particle. For example, the side of a pillar-like form particle is observed by a scanning electron microscope (S4200, manufactured by Hitachi Ltd.), etc. to acquire a two-dimensional image. In this case, the projected image has four sides. When the portion formed of two adjacent sides is defined as an end part, if the end part is formed of only two adjacent straight lines, an angle is formed and the particle has a point. If the end part is arc as illustrated in FIG. 1C, no point is formed.

Circularity of such a pillar-like form particle having no point can be increased so that flowability is enhanced and packing density can be more increased. This is extremely suitable to improve the strength of a solid freeform fabrication object and dimension accuracy.

It is most preferable that all the pillar-like form particles of the resin powder for solid freeform fabrication have no points. It is preferable that the proportion of the pillar-like form particles having no point be high Specifically, the proportion of the pillar-like form particles having no point to all the pillar-like form particles is preferably 30 percent or more, more preferably 50 percent or more, furthermore preferably 75 percent or more, and particularly preferably 90 percent or more. Due to this, the average circularity of the resin powder increases, which is preferable for the present disclosure.

Whether the pillar-like form particle has a point can be determined by, for example, as described above, observing the resin powder with a scanning electron microscope (S4200, manufactured by Hitachi Ltd.), etc. to obtain two-dimensional images and calculating the proportion of the pillar-like form particles having no point to all the pillar-like form particles. For example, the two-dimensional images of 10 vision fields are obtained by the method described above to obtain the proportion of the pillar-like form particles having no point to all the pillar-like form particles and calculate the average.

The pillar-like form particle having no point has not necessarily neat significantly cylindrical forms or polygonal forms but may include a form with constriction, a form having an extended end portion, a crushed form, or a twisted or curved form in the projected image of side plane.

To make the pillar-like form particle in resin powder pointless, any method of rounding points of pillar-like form particles can be used. For example, it is possible to use known spheroidizing treatment devices utilizing mechanical pulverization of high speed rotation or high speed impact or surface melting by mechanical abrasion.

The average circularity of the resin powder for solid freeform fabrication is preferably from 0.7 to 0.98 and more preferably from 0.83 to 0.98 in the particle size range of from 0.5 to 200 μm. The average circularity is an arithmetical average value of circularity of resin powder for solid freeform fabrication measured by, for example, a wet process flow type particle size and form analyzer (FPIA-3000, manufactured by Sysmex Corporation). For example, the average circularity can be easily obtained by digitization based on the measuring using a wet process flow type particle size and form analyzer (FPIA-3000, manufactured by Sysmex Corporation). This device takes particle images at high speed in a liquid suspension flowing in a glass cell by a charge-coupled device (CCD) and analyzes individual particle images in real time. This device is suitable to obtain the average circularity in the present disclosure. The number of measuring counts has no particular limit and is preferably 1,000 or greater and more preferably 3,000 or greater.

The resin powder for solid freeform fabrication is preferably separated pillar-like form particles.

Thermoplastic resin can be used to form the particle in the present disclosure. The thermoplastic resin is plasticized and melted when heat is applied. Crystalline thermoplastic resin can be also used. The crystalline resin has a melt peak as measured according to ISO 3146 (Testing Methods for Transition Temperatures of Plastics JIS K7121).

The crystalline thermoplastic resin is preferably crystal-controlled. Of these, crystalline thermoplastic resin having crystal size and crystal alignment controlled by a method of external stimuli such as heat, extension, crystal nuclear material, ultrasonic treatment are more preferable because it is free of errors during recoating at high temperatures.

The method of manufacturing the crystalline thermoplastic resin has no particular limit and can be suitably selected to suit to a particular application. For example, resin powder can be heated to the glass transition temperature or higher and thereafter subject to annealing with an optional addition of crystal nucleating agent before the annealing to enhance crystallinity. Also, a method of applying ultrasonic wave to enhance crystallinity, a method of dissolution in a solvent and slow evaporation to enhance crystallinity, a method of applying an external electric field to grow crystal, and a method of processing such as pulverizing and cutting a highly-aligned and highly crystallized article obtained by extension are suitable.

In the annealing, the resin is heated at a temperature 50 degrees higher than the glass transition temperature thereof for three days and thereafter slowly cooled down to room temperature.

In the extension, an extruder is used to extrude and extend a melted resin for solid freeform fabrication in fibrous form while being stirred at a temperature 30 degrees C. higher than the melting point. The melted resin for solid freeform fabrication is extended to around 1/1 to around 1/10 to obtain fiber. The form of the cross section of the fiber can be determined by the form of the nozzle mouth of the extruder. In the present disclosure, when the pillar-like form is a significantly cylindrical form, the nozzle mouth is preferably circular. When the pillar-like form is a cuboid, the nozzle mouth is preferably a cuboid or square form. Productivity increases in proportion to the number of nozzles. The maximum extension rate can be changed depending on resin and melt viscosity.

In the application of ultrasonic wave, glycerin (reagent grade, manufactured by Tokyo Chemical Industry Co. Ltd.) solvent is added to a resin in an amount of five times as much as the resin followed by heating to the temperature 20 degrees C. higher than the melting point. Thereafter, ultrasonic wave is applied thereto by an ultrasonic generator (ultrasonicator UP200S, manufactured by Hielscher Ultrasonics GmbH) at a frequency of 24 KHz and an amplitude of 60 percent for two hours. Thereafter, the resultant is rinsed with a solvent of isopropanol at room temperature preferably followed by vacuum drying.

The external electric field application is conducted by heating powder at the glass transition temperature or higher, applying an alternative electric field (500 Hz) of 600 V/cm thereto for one hour, and slowly cooling it down.

In the powder bed fusion (PBF) method, a large temperature difference (temperature window) about crystal layer change is preferable to prevent warping. It is preferable that the crystal layer change be larger because resin powder having a large difference between the melting starting temperature and the recrystallization point during cooling has better fabrication property.

Specific examples of the particle include, but are not limited to, polymers such as polyolefin, polyamide, polyester, polyarylketone, polyphenylene sulfide, a liquid crystal polymer (LCP), polyacetal (POM, melting point: 175 degrees C.), polyimide, and a fluorochemical resin. These can be used alone or in combination. The thermoplastic resin may include additives such as flame retardants, plasticizers, heat stabilizing agents, and crystal nucleating agents and polymer particles such as non-crystalline resins other than the polymers mentioned above. These can be used alone or in combination. The polymer particles can be mixed. Also, it is also possible to coat the surface of the polymer particle with the polymer particle.

Specific examples of the polyolefine include, but are not limited to, are polyethylene and polypropylene (PP, melting point: 180 degrees C.). These can be used alone or in combination.

Specific examples of the polyamide include, but are not limited to, polyamide 410 (PA410), polyamide 6 (PA6), polyamide 66 (PA66, melting point: 265 degrees C.), polyamide 610 (PA610), polyamide 612 (PA612), polyamide 11 (PA11), polyamide 12 (PA12), semi-aromatic polyamide 4T (PA4T), polyamide MXD6 (PAMXD6), polyamide 6T (PA6T), polyamide 9T (PA9T, melting point: 300 degrees C.), and polyamide 10T (PA10T). These can be used alone or in combination. PA9T is also referred to as polynonamethylene terephthal amide constituted of a diamine having 9 carbon atoms and a terephthalic acid monomer. In general, since carbon acid side is an aromatic series, PA9T is referred to as semi-aromatic series. Moreover, aramid constituted of p-phenylenediamine and a terephathalic acid monomer as aromatic series in which diamine side is also aromatic is included as the polyamide in the present disclosure.

Specific examples of the polyester include, but are not limited to, polyethyleneterephthalate (PET, melting point: 260 degrees C.), polybutadiene terephthalate (PBT, melting point: 218 degrees C.), and polylactic acid (PLA). To impart heat resistance, polyester partially including aromatic series including terephthalic acid and isophthalic acid is also suitably used in the present disclosure.

Specific examples of polyarylketone include, but are not limited to, polyether etherketone (PEEK, melting point: 343 degrees C.), polyetherketone (PEK), polyether ketone ketone (PEKK), polyaryl ether ketone (PAEK), polyether ether ketone ketone (PEEKK), and polyetherkeone ether ketone ketone (PEKEKK). In addition to the polyarylketon mentioned above, crystalline polymers are also suitable.

Specific examples include, but are not limited to, polyacetal, polyimide, and polyether sulfone. It is also suitable to use polyamide having two melting peaks such as PA9T (it is necessary to raise the temperature of a resin to the second melting peak or higher to completely melt the resin).

The resin powder for solid freeform fabrication is preferably constituted of only particles but it is suitable to mix with pulverized material.

The proportion of the pillar-like form particle is preferably 30 percent by mass, more preferably from 50 to 100 percent by mass, and furthermore preferably from 80 to 100 percent by mass, and particularly preferably from 90 to 100 percent by mass to the total content of the resin powder for solid freeform fabrication. When the proportion is 30 percent by mass or greater, it is possible to pack the particles more densely. The proportion of the pillar-like form particle can be obtained by, for example, collecting resin powder for solid freeform fabrication, observing it with scanning electron microscope (SEM), and counting the number of pillar-like form particles to the number of all the particles of the obtained SEM images.

The 50 percent cumulative volume particle diameter of the resin powder for solid freeform fabrication is from 5 to 200 μm and preferably from 20 to 70 μm and more preferably from 20 to 50 μm in terms of dimension stability. The ratio (Mv/Mn) of the volume average particle diameter to the number average particle diameter of the powder is 2.00 or less, preferably 1.50 or less, more preferably 1.30 or less, and particularly preferably 1.20 or less in terms of fabrication accuracy. The 50 percent cumulative volume particle diameter and Mv/Mn can be measured by, for example, particle size distribution measuring device (microtrac MT3300 EXII, manufactured by MicrotracBEL Corp).

The resin powder for solid freeform fabrication preferably satisfies at least one of the following relations (conditions) (1) to (3).

(1): Tmf1>Tmf2 and (Tmf1−Tmf2)≥3 degrees C., where Tmf1 represents a melting starting temperature of an endothermic peak as the resin powder is heated to a temperature 30 degrees C. higher than a melting point of the resin powder at a temperature rising speed of 10 degrees C. per minute for the first time and Tmf2 represents a melting starting temperature of an endothermic peak as the resin powder is heated for the first time as mentioned above, cooled down to −30 degrees C. or lower at a temperature falling speed of 10 degrees C. per minute, and heated to the temperature 30 degrees C. higher than the melting point at a temperature rising speed of 10 degrees C. per minute for the second time, and both Tmf1 and Tmf2 are measured in differential scanning calorimetry measuring according to ISO 3146. The melting starting temperature of the endothermic peak represents a temperature at a point −15 mW lower from a straight line parallel to X axis drawn from a site where quantity of heat becomes constant after endotherm at the melting point is finished to the lower temperature side.

(2): Cd1>Cd2 and (Cd1−Cd2)≥3 percent, where Cd1 represents a crystallinity obtained from an energy amount of the endothermic peak as the resin powder is heated to a temperature 30 degrees C. higher than the melting point of the resin powder at a temperature rising speed of 10 degrees C. per minute for the first time and Cd2 represents a crystallinity obtained from an energy amount of the endothermic peak as the resin powder is heated for the first time as mentioned above, cooled down to −30 degrees C. or lower at a temperature falling speed of 10 degrees C. per minute, and heated to the temperature 30 degrees C. higher than the melting point at a temperature rising speed of 10 degrees C. per minute for the second time, and both Cd1 and Cd2 are measured in differential scanning calorimetry measuring according to ISO 3146.

(3): Cx1>Cx2 and (Cx1−Cx2)≥3 percent, preferably (Cx1−Cx2)≥5 percent, and more preferably (Cx1−Cx2)≥10 percent, where Cx1 represents the crystallinity of the resin powder obtained by X-ray diffraction measuring and Cx2 represents the crystallinity obtained by X-ray diffraction measuring as the resin powder is heated to a temperature 30 degrees C. higher than the melting point thereof at a temperature rising speed of 10 degrees C. per minute, thereafter cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

In the relations (1) to (3), properties of the identical resin powder for solid freeform fabrication are regulated from different points of views. The relations (1) to (3) are relevant to each other. The resin powder for solid freeform fabrication of the present disclosure can be identified if the resin powder for solid freeform fabrication satisfies at least one of the relations.

Figure 3A:
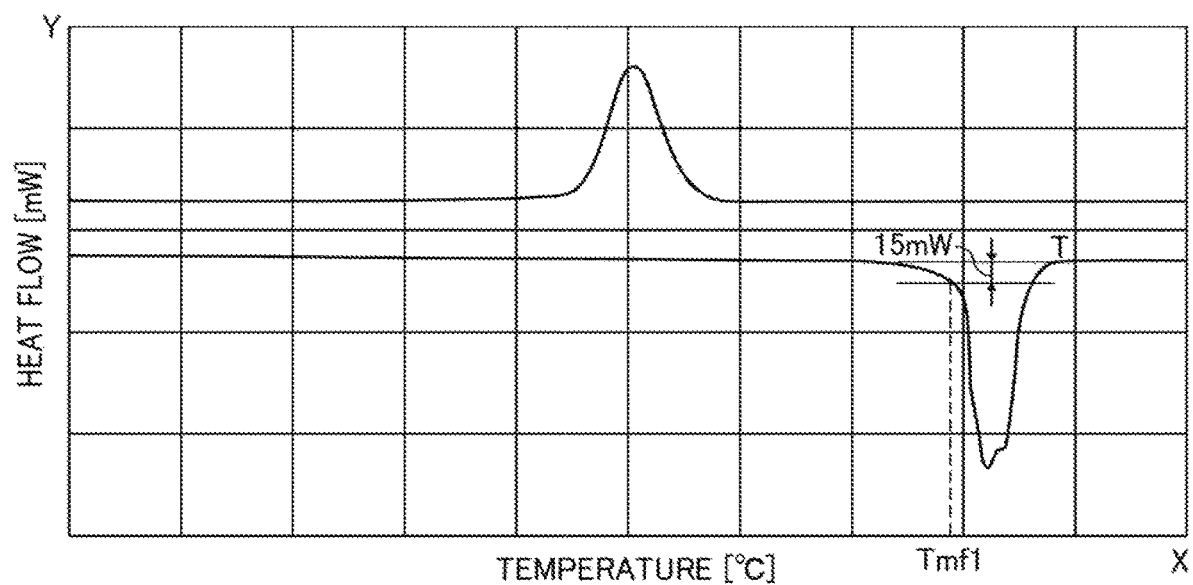
FIG. 3A is a diagram illustrating the melting starting temperature (Tmf1) of the endotherm peak.
Figure 3B:
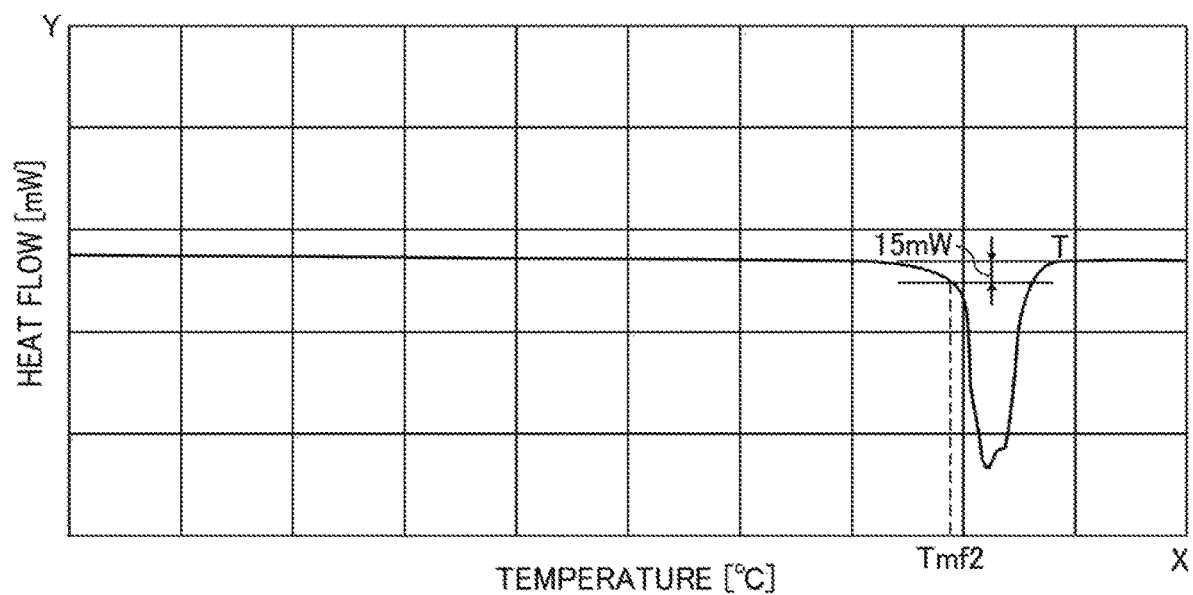
FIG. 3B is a diagram illustrating the melting starting temperature (Tmf2) of the endotherm peak.

Measuring Method of Melting Starting Temperature of Condition 1 According to Differential Scanning calorimetry Measuring The measuring method of melting starting temperature of differential scanning calorimetry (DSC) of the condition (1) is based on the measuring method of ISO 3146 (Testing Methods for Transition Temperatures of Plastics, JIS K7121). A differential scanning calorimeter (for example, DSC-60A, manufactured by Shimadzu Corporation) is used to measure the melting starting temperature (Tmf1) of the endothermic peak when the resin powder is heated to the temperature 30 degrees C. higher than the melting point thereof for the first time at a temperature rising speed of 10 degrees C. per minute. Thereafter, the resin powder is cooled down to −30 degrees C. or lower at a temperature falling speed of 10 degrees C. per minute (Cycle 1, FIG. 3A) and heated to the temperature 30 degrees C. higher than the melting point for the second time at a temperature rising speed of 10 degrees C. per minute to measure the melting starting temperature (Tmf2) of the endothermic peak (Cycle 2, FIG. 3B). The melting starting temperature of the endothermic peak represents a temperature at a point −15 mW lower from a straight line parallel to X axis drawn from a site where quantity of heat becomes constant after endotherm at the melting point finishes to the lower temperature side. As illustrated in FIGS. 3A and 3B, the melting starting temperature of the endothermic peak is a temperature (Tmf) corresponding to the intersection of the endothermic peak and −15 mW lower from a straight line parallel to X axis (temperature axis) drawn from a site where quantity of heat becomes constant after endotherm at the melting point finishes to the lower temperature side. Alternatively, the melting starting temperature is the intersection between the straight line of the base line on the low temperature side extended into the high temperature side and a tangent of the curve on the low temperature side of the melting peak at the point where the gradient is the maximum.

Measuring Method of Crystallinity of Condition 2 According to Differential Scanning Calorimetry Measuring The measuring method of crystallinity of differential scanning calorimetry (DSC) of the condition (2) is based on the measuring method according to ISO 3146 (Testing Methods for Transition Temperatures of Plastics, JIS K7121). The energy amount (heat amount of melting) of an endothermic peak when heated to the temperature 30 degrees C. higher than the melting point of powder resin at a temperature rising speed of 10 degrees C. per minute is measured to obtain crystallinity (Cd1) from the heat amount of melting to the heat amount of perfect crystallization. Thereafter, the resin powder is cooled down to −30 degrees C. or lower at a temperature falling speed of 10 degrees C. per minute and heated to the temperature degrees C. higher than the melting point at a temperature rising speed of 10 degrees C. per minute to measure the energy amount of the endothermic peak so that crystallinity (Cd2) can be obtained from the heat amount of melting to the heat amount of perfect crystallization.

Measuring Method of Crystallinity of Condition 3 According to X-Ray Analyzer

Crystallinity of resin powder of the condition 3 is obtained by, for example, measuring crystallinity (C×1) of the resin powder placed on a glass plate by an X-ray analyzer including a two-dimensional detector (for example, Discover 8, manufactured by Bruker) at a 2θ range of from 10 to 40 at room temperature. Next, in the DSC, in a nitrogen atmosphere, the resin is heated to 30 degrees C. higher than the melting point thereof at a temperature rising speed of 10 degrees C. per minute. The temperature is kept for 10 minutes and the temperature of the sample (resin powder) is back to room temperature after being cooled down to −30 degrees C. at a temperature falling speed of 10 degrees C. per minute. Crystallinity (C×2) can be measured like C×1.

The resin powder for solid freeform fabrication may furthermore optionally include, flowability increasing agent (fluidizer), toughening agent, antioxidant, and flame retardant. The proportion of the fluidizer is sufficient if it covers the surface of particles and preferably from 0.1 to 10 percent by mass to the total content of resin powder for solid freeform fabrication. Particulate inorganic material having a volume average particle diameter of less than 10 μm can be the fluidizer.

There is no specific limit to the fluidizer and it can be suitably selected to suit to a particular application. For example, spherical inorganic particles are preferable. Specific examples include, but are not limited to, silica, alumina, titania, zinc oxide, magnesium oxide, tin oxide, iron oxide, copper oxide, hydrated silica, silica having a surface modified by silane coupling agent, and magnesium silicate. In particular, in terms of effect, silica, titania, hydrated silica, and silica having a surface modified by silane coupling agent are preferable. In terms of cost, silica having a surface modified to have hydrophobicity by a silane coupling agent is particularly preferable. These can be used alone or in combination.

The toughening agent is used to improve toughness and examples thereof are fiber fillers, bead fillers, glass filler, glass bead, carbon fiber, aluminum ball disclosed in WO 2008/057844. These can be used alone or in combination.

The resin powder for solid freeform fabrication of the present disclosure is preferably dried suitably. Using a vacuum drier or silica gel is suitable to dry the resin powder before usage.

In addition, in terms of preventing deterioration of resin, it is preferable to add the antioxidant thereto. Examples of the antioxidant are hydrazine-based agents metal chelate, triadine based agents as ultraviolet absorber, hindered phenol-based agents as radical supplement agent, and phosphate-based and sulfur-containing agent as antioxidant. These can be used alone or in combination.

There is no specific limit to fiber filler and it can be suitably selected to suit to a particular application. For example, carbon fiber, inorganic glass fiber, and metal fiber are preferable.

There is no specific limit to bead filler and it can be suitably selected to suit to a particular application. For example, carbon bead, inorganic glass fiber, and metal bead are preferable.

In general, accuracy of fabricated objects tends to deteriorate if fiber filler or bead filler is mixed with resin powder for solid freeform fabrication having no sharp melting property. This is because since heat conductivity of fiber filler or bead filler to be added is higher than that of the resin powder for solid freeform fabrication, heat applied to the irradiated sites diffuses outside the irradiated sites when the powder surface is irradiated with laser beams during SLS fabrication so that the temperature of the resin powder outside the irradiation surpasses the melting point, which leads to excessive fabrication. Conversely, powder mixture of the resin powder for solid freeform fabrication of the present disclosure (which is the crystalline thermoplastic resin composition having sharp melting property) and fiber filler and bead filler are not easily melted even when the resin temperature outside laser irradiation rises due to heat diffusion because the resin powder has sharp melting property. Therefore, excessive fabrication can be prevented and high fabrication accuracy can be maintained.

In addition, the fiber filler preferably has an average fiber diameter of from 1 to 30 μm and an average fiber length of from 30 to 500 μm. When fiber filler having an average fiber diameter or an average fiber length in such a range is used, strength of a fabricated object is improved and the surface roughness of the fabricated object can be maintained at the same level as with a fabricated object having no fiber filler.

The bead filler preferably has a circularity of from 0.8 to 1.0 and a volume average particle diameter of from 10 to 200

μm. The circularity is obtained by the following relation, where S represents an area (number of pixels) and L represents a perimeter.

$$Circularity = 4\pi S/L^2$$

The volume average particle diameter can be measured by using a particle size distribution measuring instrument (Microtrac MT3300EXII, manufactured by MicrotracBEL Corp.).

The proportion of the fiber filler is preferably from 5 to 60 percent by mass to the total content of the resin powder for solid freeform fabrication. When the proportion is below this range, strength is not enhanced by this addition of fiber filler. When the proportion is above this range, fabrication becomes difficult.

The proportion of the bead filler is preferably from 5 to 60 percent by mass to the total content of the resin powder for solid freeform fabrication. When the proportion is 5 percent by mass or greater, strength of a fabricated object is enhanced. When the proportion is 60 percent by mass or less, fabrication becomes easy.

Flame retardants are suitably used for, for example, material for building, vehicle, ship outfitting, etc. which require fire defense.

Examples are, halogen-based, phosphorus-based, inorganic hydrated metal compound-based, nitrogen-containing, silicone-containing retardants. These can be used alone or in combination. If two or more flame retardants are used in combination, the combination of halogen-based and inorganic hydrated metal compound-based retardants is preferable to improve flame retardancy.

Flame retardancy can be enhanced by adding inorganic toughening agents such as inorganic fibrous materials such as glass fiber, carbon fiber, aramid fiber and inorganic laminate silicate such as talc, mica, and montmorillonite. Inclusion of such material makes it possible to meet a balance between enhancing property and flame retardancy.

Flame retardancy of the resin powder for the solid freeform fabrication can be evaluated by, for example, JIS K6911, JIS L1091 (ISO 6925), JIS C3005, and pyrogen test (using a cone calorimeter).

The proportion of the flame retardant is preferably from 1 to 50 percent by mass to the total content of the resin powder for solid freeform fabrication and more preferably from to 30 percent by mass to furthermore improve flame retardancy. When the proportion is 1 percent by mass or more, flame retardancy is sufficiently secured. In addition, when the proportion is 50 percent by mass or less, melt solidification property of the resin powder for solid freeform fabrication does not change easily and it is possible to prevent deterioration of fabrication accuracy and properties.

The proportion of antioxidant is preferably from 0.05 to 5 percent by mass, more preferably from 0.1 to 3 percent by mass, and furthermore preferably from 0.2 to 2 percent by mass to the total content of the resin powder for solid freeform fabrication. When the proportion is within the range specified above, heat deterioration can be prevented and resin powder used for fabrication can be reused.

In addition, color change due to heat can be prevented.

In addition, the resin powder for solid freeform fabrication can be used in the SLS method or SMS method and has properties striking a balance between parameters such as particle size, particle size distribution, heat transfer properties, melt viscosity, bulk density, flowability, melting temperature, and recrystallization temperature.

To promote laser sintering degree in the PBF method, the bulk density of the resin powder for solid freeform fabrication is preferably large when the density of the resin varies. For example, it is preferably 0.35 g/mL or greater, more preferably 0.40 g/mL or greater, and particularly preferably 0.5 g/mL or greater as tap density.

A fabricated object formed by laser sintering using the resin powder for solid freeform fabrication is smooth and has a surface having a resolution sufficient to indicate minimum orange peel or less. The orange peel means surface deficiency such as unsuitable coarse surface or voids or warping on the surface of a fabricated object formed by laser sintering in the PBF method in general. Voids have significant adverse impacts on mechanical strength and aesthetic issues.

Furthermore, it is preferable that solid freeform fabrication objects formed by laser sintering using the resin powder for solid freeform fabrication be free of unsuitable process properties such as warping and distortion due to phase changes and fuming during sintering until cooling after sintering.

The resin powder for solid freeform fabrication of the present disclosure has excellent recyclability. Also, solid freeform fabrication objects formed of fresh powder by the PBF method are free of (a) orange peel and (b) significant deterioration in mechanical performance (30 percent or more deterioration in tensile strength).

After the recycled powder for use in the present disclosure is tested at least once, preferably five times, more preferably seven times, and particularly preferably at least ten times according to the recycling method described in the test method according to ISO 3167 Type 1A, a dog-bone-like test specimen for multiple purposes having a length of 150 mm free of (a) and (b) mentioned above can be manufactured by a manufacturing device employing PBF method (AM S5500P, manufactured by Ricoh Company Ltd.).

The resin powder for solid freeform fabrication of the present disclosure can be manufactured by a method of manufacturing pillar-like fiber and cutting the fiber to directly obtain a significantly cylindrical form or cuboid, a method of manufacturing cuboid or cube from film-like form, or a method of manufacturing cuboid particles and subjecting the particles to post-processing to obtain significantly cylindrical form.

Fiber is manufactured by extending melted resin for solid freeform fabrication by an extruder during stirring at temperatures 30 degrees C. or greater higher than the melting point. The melted resin for solid freeform fabrication is extended to around 1/1 to around 1/10 to obtain fiber. The form of the cross section of the fiber can be determined by the form of the nozzle of the extruder. In the present disclosure, when the cross section is circular, the nozzle mouth is preferably circular. It is preferable that the dimension accuracy is higher. The circular form of a plane portion is at least 10 percent or less at radius. Productivity rises as the number of nozzles increases.

For cutting, a cutting machine employing guillotine method in which both the upper edge and the lower edge are blades or a cutting machine employing a straw cutter method of cutting with an upper edge with a board disposed on the bottom side instead of a blade can be used. The fiber is directly cut to 0.005 to 0.2 mm by such a device or $CO_2$ laser, etc. The powder of the present disclosure can be directly obtained by those methods.

The resin powder for solid freeform fabrication can be obtained by typical pulverization method. For example, the powder is obtained by pulverizing pellets, etc. at room temperature using a pulverizer. The obtained powder is subject to classification using a filter to remove particles having a diameter outside the target. The powder is preferably obtained by pulverization at low temperatures of 0 degrees C. or below (not higher than the brittleness temperature of each resin), more preferably −25 degrees C. or below, and particularly preferably at extremely low temperatures of −100 degrees C. or below utilizing resin brittleness.

It is preferable to obtain resin powder for solid freeform fabrication under another suitable condition where sintering is conducted every time a new powder layer is pressed by a roller. In the sintering process, the powder layer portion is selectively melted. The new powder layer is formed on the previously formed layer and selectively melted again. This operation is repeated until a target solid freeform fabrication object is manufactured.

The resin powder for solid freeform fabrication is typically melted by electromagnetic wave irradiation. The resin powder is selectively melted by, for example, retardants, absorbents, or electromagnetic wave irradiation (for example, by masking or direct laser beams). There is no specific limit to selections of electromagnetic wave irradiation sources. For example, $CO_2$ laser, infra red irradiation source, microwave generators, radiant heaters, LED lamps, and combinations thereof are usable.

In some embodiments, solid freeform fabrication objects of the present disclosure can be manufactured using selective mask sintering (SMS) technologies. The SMS process is described in, for example, U.S. Pat. No. 6,531,086.

In the SMS process, powder layers are partially and selectively irradiated with infra red while being selectively shielded by using a shielding mask. When utilizing the SMS process to manufacture an article from the resin powder for solid freeform fabrication of the present disclosure, it is preferable to contain at least one kind of material to enhance infrared absorption of the resin powder for solid freeform fabrication. The resin powder for solid freeform fabrication may contain at least one kind of heat absorbent and/or dark color material (such as carbon fiber, carbon black, carbon nanotube, and cellulose nanofiber).

To manufacture a solid freeform fabrication object by the PBF method using the resin powder for solid freeform fabrication of the present disclosure, it is preferable to laminate multiple layers containing polymer matrix and attached sintered layers. The sintered layer preferably has a thickness suitable for the fabrication process. The average thickness of the multiple sintered layers is preferably 10 μm or greater, more preferably 50 μm or greater, and particularly preferably 100 μm or greater. The average thickness of the multiple sintered layers is preferably less than 200 μm, more preferably less than 150 μm, and particularly preferably less than 120 μm.

The resin powder for solid freeform fabrication of the present disclosure can be suitably used to form articles used as prototypes of electronic device parts, vehicle parts, and prototypes for strength test, and low volume products for use in aerospace or dress up tools for the auto industry. Methods other than the PBF method are expected to manufacture objects having excellent strength in comparison with FDM and inkjet, so that objects manufactured by such methods can be practically used. The production speed is not on par with mass production of injection molding, etc. However, for example, it is possible to obtain required amount of production by manufacturing a massive amount of small parts in a two-dimensional manner. In addition, the method of manufacturing a solid freeform fabrication object by PBF method for use in the present disclosure obviates the need for dies unlike injection molding. Therefore, overwhelming cost reduction and short delivery time are achieved in the case of manufacturing prototypes if utilizing this method.

Method of Manufacturing Solid Freeform Fabrication Object and Device for Manufacturing Solid Freeform Fabrication Object The method of manufacturing a solid freeform fabrication object of the present disclosure includes forming a layer containing the resin powder for solid freeform fabrication of the present disclosure, applying electromagnetic wave to the formed layer to cure it, and repeating the film forming and applying. The method may furthermore optionally include other processes.

The device for manufacturing a solid freeform fabrication object includes a layer forming device to form a layer including the resin powder for solid freeform fabrication object of the present disclosure and a powder attaching device to attach resin powder to each other in a selected area of the layer and may furthermore optionally include other devices.

The method of manufacturing a solid freeform fabrication object of the present disclosure can be suitably executed by the device for manufacturing a solid freeform fabrication object.

An example of the powder attaching device is a curing device that irradiates levelized powder with electromagnetic wave or laser beams to melt and cool the resin powder for curing.

Examples of the electromagnetic wave generator for use in electromagnetic wave irradiation are $CO_2$ laser, infra red irradiation source, microwave generators, radiant heaters, LED lamps, and combinations thereof are usable.

Figure 2:
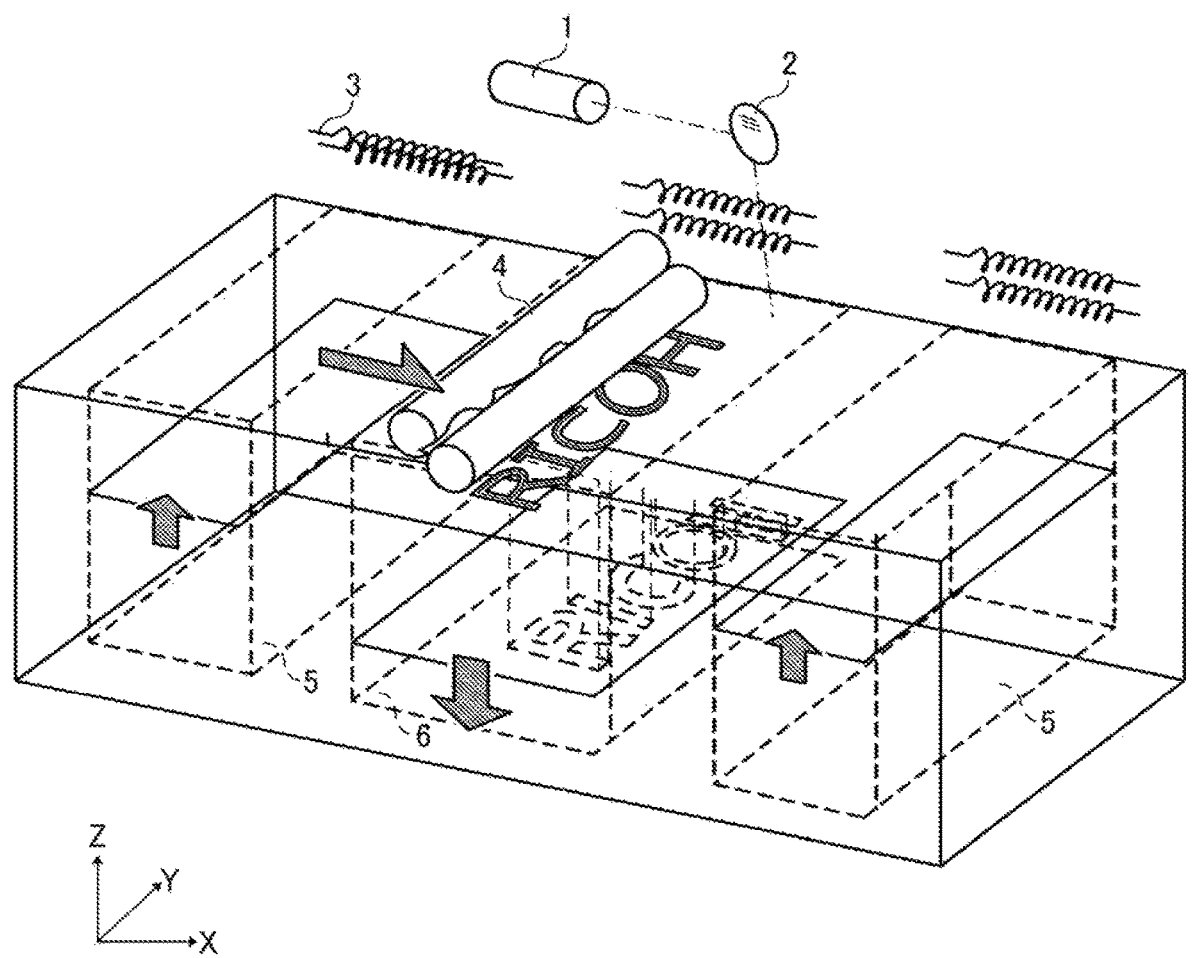
FIG. 2 is a schematic diagram illustrating an example of the device for manufacturing a solid freeform fabrication object (three-dimensional object) according to an embodiment of the present invention.

The device for manufacturing a solid freeform fabrication object is described referring to FIG. 2. FIG. 2 is a schematic diagram illustrating an example of the device for manufacturing a solid freeform fabrication object for use in the method of manufacturing a solid freeform fabrication object of the present disclosure. As illustrated in FIG. 2, powder is stored in a supplying tank 5 for powder and supplied to a laser scanning space 6 using a roller 4 depending on the usage amount. It is preferable that the temperature of the supplying tank 5 be controlled by a heater 3. The laser scanning space 6 is irradiated with the laser beams emitted from an electromagnetic wave irradiation source 1 using a reflection mirror 2. The powder is sintered due to the heat of the laser beams to obtain a solid freeform fabrication object.

The temperature of the supplying tank 5 is preferably 10 degrees C. or more lower than the melting point of the powder.

The temperature of the part bed in the laser scanning space 6 is preferably 5 degrees C. or more lower than the melting point of the powder.

The power of the laser has no particular limit and can be suitably selected to suit to a particular application. For example, it is preferably from 10 to 150 W.

Solid Freeform Fabrication Object

The solid freeform fabrication object can be suitably manufactured by the method of manufacturing a solid freeform fabrication object of the present disclosure.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto.

Melting point, 50 percent cumulative volume particle diameter, volume average particle diameter (Mv), number average particle diameter (Mn), average circularity, specific gravity, and tap density were measured for the obtained resin powder for solid freeform fabrication in the following manner. The results are shown in Tables 1 and 2.

Melting Point

The melting point was measured according to ISO 3146.

50 Percent Cumulative Volume Particle Diameter, Volume Average Particle Diameter (Mv), and Number Average Particle Diameter (Mn)

The 50 percent cumulative volume particle diameter, the volume average particle diameter, and the number average particle diameter were measured by using a particle size distribution measuring instrument (Microtrac MT3300EXII, manufactured by MicrotracBEL Corp.) employing a drying process (atmosphere) method without using a solvent, utilizing particle refractive index per resin powder for solid freeform fabrication. The particle refractive index was set for polybutylene terephthalate (PBT) resin of 1.57, polyamide 66 (PA66) resin of 1.53, polyamide 9T (PA9T) resin of 1.53, polypropylene (PP) resin of 1.48, polyether ether ketone (PEEK) resin of 1.57, and polyacetal (POM) resin of 1.48. The ratio (Mv/Mn) of the volume average particle diameter to the number average particle diameter was calculated from the thus-obtained volume average particle diameter and the number average particle diameter.

Average Circularity

Using a wet-process flow type particle size and form analyzer (FPIA-3000, manufactured by Sysmex Corporation), particle form images were obtained in a state where the number of powder particles was 3,000 or more to obtain the average of the circularity of the particles having a particle diameter of from 0.5 to 200 μm. The circularity was measured twice for each and the average of the two was determined as the average circularity.

Specific Gravity

The specific gravity was obtained by measuring the density of a sample. The density was obtained by measuring the mass of the sample from the volume thereof. The volume was obtained by changing volume and pressure of gas (He gas) at a constant temperature by using a dry-process pycnometer (AccuPyc 1330, manufactured by Shimadzu Corporation) utilizing gas-phase replacement method.

Tap Density

The tap density was evaluated according to the method based on ISO 1068.

100 g of a sample was placed in a 250 mL glass measuring cylinder (manufactured by SIBATA SCIENTIFIC TECHNOLOGY LTD.) without tapping and thereafter the measuring cylinder was mounted onto a tapping tool. The device was stopped after tapping 1,300 times to read the volume of the sample. Moreover, subsequent to another tapping 1,300 times until the difference of the two did not surpass 2 mL, the smaller volume was read. The weighed mass of the sample was divided by the volume value read to obtain the tap density.

Example 1

0.5 percent by mass of phenol-based antioxidant (AO-80, manufactured by ADEKA CORPORATION) and 1.0 percent by mass of phosphate-based antioxidant (PEP-36, manufactured by ADEKA CORPORATION) were added to 98.5 percent by mass of polybutylene terephthalate (PBT) resin (NOVADURAN® 5020, melting point: 218 degrees C., glass transition temperature: 43 degrees C., manufactured by Mitsubishi Engineering-Plastics Corporation). After being stirred at 30 degrees C. higher than the melting point by using an extruder (manufactured by The Japan Steel Works, LTD.), the melted matter of resin for solid freeform fabrication was extruded from a circular nozzle and extended in a fibrous form. The number of fibers extruded from the nozzle was 100. After the resin was extended to about 4 times and a fiber having an accuracy of from −4 to +4 μm at a fiber diameter of 60 μm was made, the fiber was cut by a cutting device (NJ series 1200 type, manufactured by OGINO SEIKI CO., LTD.) employing a straw cutter method at 0.08 mm (80 μm) to obtain particles having a significantly cylindrical form as resin powder for solid freeform fabrication.

The cross section was observed by a scanning electron microscope (S4200, manufactured by Hitachi, Ltd.) with a magnifying power of 300 times after the cutting. The fiber was cleanly cut and the cross sections thereof were parallel to each other. In addition, the height of the significantly cylindrical form was measured. The fiber was cut with an accuracy of from 50 to 70 μm. The fiber was not crushed overall during the cutting but specifically about 1 of 100 particles was crushed. Some swelled in such a manner that the height direction swelled against the circular plane like a barrel or dented towards the opposite side. In addition, the melting energy increased up to about twice due to crystal control by extension. Under the first time heating condition of DSC, the melting starting time (Tmf1) was 219 degrees C. Under the second time heating condition, the melting starting temperature (Tmf2) was 210 degrees C. Tmf1−Tmf2=9 degrees C.

Example 2

Using the material used in Example 1 and the extruder (manufactured by The Japan Steel Works, LTD.), after stirring at the temperature 30 degrees C. higher than the melting point, a melted sheet extruded from the nozzle was extended to about 4 times using a T die (manufactured by The Japan Steel Works, LTD.) and brought into contact with a cooling roll for cooling and solidification. As a result, a film having a size of 1,000 mm×1,000 mm with an average thickness of 80 μm was obtained. The thus-obtained film was cut by a cutting device (NJ series 1200 type, manufactured by OGINO SEIKI CO., LTD.) employing straw cutting method. The film was cut to have a thickness of 60 μm and a width of 80 μm. Thereafter, the film was rotated 90 degrees and cut to have a thickness of 80 μm and a width of 80 μm to obtain a cubic particle having a side of 80 μm as the resin powder for solid freeform fabrication. During the cutting, the particle was suctioned by a suction machine to prevent double cutting. The cross section was observed by a scanning electron microscope with a magnifying power of 300 times after the cutting. The fiber was cleanly cut and the cross sections thereof were parallel to each other. Also, no particle incurring double cutting was observed. In addition, each side of the cube was measured. The accuracy of cutting was from 70 to 90 μm. No particle were crushed by the cutting.

Example 3

A resin powder for solid freeform fabrication was obtained in the same manner as in Example 1 except that polybutylene terephthalate (PBT) resin was changed to polyamide 66 (PA66) resin (Leona™ 1300S, melting point: 265 degrees C., manufactured by Asahi Kasei Chemicals Corporation).

Example 4

After stirring polyamide 9T (PA9T) resin (Genestar™ N1000A, melting point: 300 degrees C., manufactured by KURARAY CO., LTD.) at the temperature 30 degrees C. higher than the melting point using an extruder (manufactured by The Japan Steel Works, LTD.), a melted resin for solid freeform fabrication was extruded from a circular nozzle and extended in fibrous form. The number of fibers extruded from the nozzle was 60. After the resin was extended to about 1.2 times to obtain a fiber having a diameter of from 38 to 42 μm, the fiber was cut by a cutting device (HP600, manufactured by Tsuji Tekkou) employing a guillotine method at 0.04 mm (40 μm) to obtain particles having a significantly cylindrical form as resin powder for solid freeform fabrication.

The cross section was observed by a scanning electron microscope with a magnifying power of 300 times after the cutting. The fiber was cleanly cut and the cross sections thereof were parallel to each other. In addition, the height of the significantly cylindrical form was measured. The fiber was cut with an accuracy of from 32 to 48 μm. No particle were crushed by the cutting.

Example 5

Particles having significantly cylindrical form were obtained as the resin powder for solid freeform fabrication in the same manner as in Example 1 except that polybutylene terephthalate (PBT) resin was changed to polypropylene (PP) resin (NOVATEC™ MA3, melting point: 180 degrees C., glass transition temperature: 0 degrees C., manufactured by JAPAN POLYPROPYLENE CORPORATION).

Example 6

Particles having significantly cylindrical form were obtained as the resin powder for solid freeform fabrication in the same manner as in Example 1 except that polybutylene terephthalate (PBT) resin was changed to polyetherether ketone (PEEK) resin (HT P22PF, melting point: 343 degrees C., glass transition temperature: 143 degrees C., manufactured by VICTREX) and the extension rate was changed to three times.

Example 7

Particles having significantly cylindrical form were obtained as the resin powder for solid freeform fabrication in the same manner as in Example 1 except that polybutylene terephthalate (PBT) resin was changed to polyacetal (POM) resin (Jupital® F10-01, melting point: 175 degrees C., manufactured by Mitsubishi Engineering-Plastics Corporation).

Comparative Example 1

A polybutylene terephthalate (PBT) resin (NOVA-DURAN® 5020, melting point: 218 degrees C., glass transition temperature: 43 degrees C., manufactured by Mitsubishi Engineering-Plastics Corporation) was subject to frost shattering at −200 degrees C. using a cold pulverization system (Cryogenic Grinding Unit, LINREX MILL LX1, manufactured by Hosokawa Micron Corporation) to obtain a resin powder for solid freeform fabrication. The thus-obtained resin powder for solid freeform fabrication was pulverized until the size ranged from 5 to 200 μm. 50 percent cumulative volume particle diameter was 65 μm.

Comparative Example 2

A resin powder for solid freeform fabrication was obtained in the same manner as in Comparative Example 1 except that polybutylene terephthalate (PBT) resin was changed to polyamide 66 (PA66) resin (Leona™ 1300S, melting point: 265 degrees C., manufactured by Asahi Kasei Chemicals Corporation). The thus-obtained resin powder for solid freeform fabrication was pulverized until the size ranged from 5 to 200 μm. 50 percent cumulative volume particle diameter was 50 μm.

Comparative Example 3

A resin powder for solid freeform fabrication was obtained in the same manner as in Example 1 except that polybutylene terephthalate (PBT) resin was changed to polyamide 9T (PA9T) resin (Genestar™ N1000A, melting point: 300 degrees C., manufactured by KURARAY CO., LTD.) and a blade having a chipped edge with less cutting accuracy was used.

Comparative Example 4

A resin powder for solid freeform fabrication was obtained in the same manner as in Example 1 except that polybutylene terephthalate (PBT) resin was changed to polypropylene (PP) resin (NOVATEC™ MA3, melting point: 180 degrees C., glass transition temperature: 0 degrees C., manufactured by JAPAN POLYPROPYLENE CORPORATION) and the cutting length was lengthened.

Comparative Example 5

A resin powder for solid freeform fabrication was obtained in the same manner as in Comparative Example 1 except that polybutylene terephthalate (PBT) resin was changed to polyetherether ketone (PEEK) resin (HT P22PF, melting point: 343 degrees C., glass transition temperature: 143 degrees C., manufactured by VICTREX). The thus-obtained resin powder for solid freeform fabrication was pulverized until the size ranged from 5 to 200 μm. 50 percent cumulative volume particle diameter was 10 μm.

Comparative Example 6

A resin powder for solid freeform fabrication was obtained in the same manner as in Example 1 except that polybutylene terephthalate (PBT) resin was changed to polyacetal (POM) resin (Jupital® F10-01, melting point: 175 degrees C., manufactured by Mitsubishi Engineering-Plastics Corporation) and the fiber length and fiber cutting length were changed.

Accuracy, orange peel property, recyclability, and tensile strength were evaluated for those obtained resin powders for solid freeform fabrication. The results are shown in Table 2.

Accuracy

A solid freeform fabrication object was manufactured by an SLS method fabrication device (AM S5500P, manufactured by Ricoh Company, Ltd.) using the obtained resin powder for solid freeform fabrication. The conditions were: average layer thickness of 0.1 mm, a laser output of from 10 to 150 W, a laser scanning space of 0.1 mm, and a part bed temperature of 3 degrees C. below the melting point. Based on data such as CAD of a cuboid solid freeform fabrication object (sample for dimension) having a side of 5 cm and an average thickness of 0.5 cm, the sample for dimension (mm) was manufactured. The difference between the CAD data of the sample for dimension and the length of each side of the fabricated (manufactured) sample was obtained. The average of the differences was defined as dimensional error to evaluate accuracy.

Orange Peel Property

The surface of the solid freeform fabrication object obtained in the accuracy evaluation was observed to evaluate orange peel property based on the following evaluation criteria.

Evaluation Criteria

A: No unsuitable surface defects such as coarse surface, voids, and warping were observed B: Unsuitable surface defects such as coarse surface, voids, and warping were observed Recyclability and Tensile Strength 10 kg of powder was loaded in the supplying bed of an SLS method fabrication device (AM S5500P, manufactured by Ricoh Company, Ltd.) to evaluate the recyclability of the resin powder for solid freeform fabrication in the SLS process. The conditions of the SLS method fabrication device were the same as those for the evaluation on accuracy. From the powder, the long side of five tensile test specimens was (a) aligned to the direction of Y axis and a fabricated object was arranged in the center of fabricated layers.

The gap between each fabrication layer was 5 mm. Next, (b) a cuboid (mm) having a side of 5 cm and an average thickness of 0.5 cm was manufactured. As the tensile test specimen, a multiple-purpose dog-bone-like test specimen (specimen having a center portion of a length of 80 mm, a thickness of 4 mm, and a width of 10 mm) having a length of 150 mm of ISO 3167 Type 1A was used. The powder used for fabrication was returned to the supplying bed, used for the fabrication as described above, and returned to the supplying bed. This fabrication operation was repeated 10 times. The thus-obtained solid freeform fabrication object was subject to the tensile test according to ISO 527 by a tensile tester (AGS-5kN, manufactured by Shimadzu Corporation) to evaluate recyclability of the obtained solid freeform fabrication object. The resin powder was evaluated for recyclability based on the following evaluation criteria. The test speed in the tension test was constant at 50 mm/minute. The solid freeform fabrication object for the first time was subject to the test five times. The initial value of tensile strength is the average of the obtained five measuring values.

Evaluation Criteria

A: No warping observed for solid freeform fabrication object fabricated for the tenth time and the deterioration rate of the mechanical strength was 30 percent or less in comparison with the initial value B: No warping observed for solid freeform fabrication object fabricated for the tenth time and the deterioration rate of the mechanical strength was greater than 30 percent in comparison with the initial value.

TABLE 1

| | | Particle | | |
|---|---|---|---|---|
| | Material name | Form | Size (Significant cylindrical form: diameter (μm) × height (μm)) (Cuboid: length (μm) × breadth (μm) × height (μm)) | Ratio (diameter or long side/height) |
| Comparative Example 1 | PBT | Random (frost shattering) | — | — |
| Example 1 | PBT | Significantly Cylindrical Form | 60 × 80 | 0.75 |
| Example 2 | PBT | Cuboid (cube) | 80 × 80 × 80 | 1.00 |
| Comparative Example 2 | PA66 | Random (frost shattering) | — | — |
| Example 3 | PA66 | Significantly Cylindrical Form | 60 × 80 | 0.75 |
| Comparative Example 3 | PA9T | Significantly Cylindrical Form | 40 × 40 | 1.00 |
| Example 4 | PA9T | Significantly Cylindrical Form | 40 × 40 | 1.00 |
| Comparative Example 4 | PP | Significantly Cylindrical Form | 60 × 180 | 3.00 |
| Example 5 | PP | Significantly Cylindrical Form | 60 × 80 | 0.75 |
| Comparative Example 5 | PEEK | Random (frost shattering) | — | — |
| Example 6 | PEEK | Significantly Cylindrical Form | 60 × 80 | 0.75 |
| Comparative Example 6 | POM | Significantly Cylindrical Form | 200 × 210 | 0.95 |
| Example 7 | POM | Significantly Cylindrical Form | 60 × 80 | 0.75 |

| | Resin powder for solid freeform fabrication | | | | |
|---|---|---|---|---|---|
| | Melting point (degrees C.) | 50 percent cumulative volume particle diameter (μm) | Average Circularity | Specific gravity (g/mL) | Tap Density (g/mL) | Mv/Mn |
| Comparative Example 1 | 217 | 65 | 0.76 | 1.32 | 0.52 | 1.49 |
| Example 1 | | 68 | 0.82 | 1.35 | 0.67 | 1.15 |
| Example 2 | | 68 | 0.81 | 1.36 | 0.74 | 1.10 |
| Comparative Example 2 | 265 | 50 | 0.79 | 1.07 | 0.48 | 1.59 |
| Example 3 | | 51 | 0.80 | 1.09 | 0.65 | 1.17 |
| Comparative Example 3 | 306 | 42 | 0.80 | 1.37 | 0.49 | 4.45 |
| Example 4 | | 41 | 0.81 | 1.7 | 0.64 | 1.18 |

TABLE 1-continued

| | | | | | |
|---|---|---|---|---|---|
| Comparative Example 4 | 130 | 32 | 0.80 | 0.91 | 0.39 | 1.39 |
| Example 5 | | 32 | 0.81 | 0.96 | 0.53 | 1.11 |
| Comparative Example 5 | 334 | 10 | 0.78 | 1.3 | 0.5 | 1.60 |
| Example 6 | | 12 | 0.82 | 1.32 | 0.66 | 1.28 |
| Comparative Example 6 | 175 | 210 | 0.76 | 1.41 | 0.56 | 1.35 |
| Example 7 | | 23 | 0.82 | 1.41 | 0.67 | 1.23 |

TABLE 2

| | Evaluation Results | | | |
|---|---|---|---|---|
| | Accuracy (mm) | Orange Peel Property | Recyclability | Tensile strength (initial value) (MPa) |
| Comparative Example 1 | 0.20 | B | B | 44 |
| Example 1 | 0.04 | A | A | 57 |
| Example 2 | 0.02 | A | A | 57 |
| Comparative Example 2 | 0.18 | B | B | 59 |
| Example 3 | 0.04 | A | A | 83 |
| Comparative Example 3 | 0.18 | B | B | 155 |
| Example 4 | 0.04 | A | A | 165 |
| Comparative Example 4 | 0.17 | B | B | 31 |
| Example 5 | 0.03 | A | A | 41 |
| Comparative Example 5 | 0.21 | B | B | 93 |
| Example 6 | 0.04 | A | A | 240 |
| Comparative Example 6 | 0.42 | B | B | 60 |
| Example 7 | 0.03 | A | A | 69 |

In addition, flame retardant was added in Example 1 or 3 as described in Examples 8 to 15 to obtain resin powder for solid freeform fabrication. The results are shown in Table 3. For comparison, Examples 1 and 3 are shown in Table 3.

Example 8

Particles having significantly cylindrical form were obtained as the resin powder for solid freeform fabrication in the same manner as in Example 1 except that halogen (bromine)-based flame retardant ("NONNEN" PR-2H, manufactured by Marubishi Oil Chemical Corporation) was added in an amount of 30 percent by mass when the PBT resin was charged in the extruder.

Example 9

Particles having significantly cylindrical form were obtained as the resin powder for solid freeform fabrication in the same manner as in Example 1 except that phosphorus-based flame retardant ("NONNEN" 75, manufactured by Marubishi Oil Chemical Corporation) was added in an amount of 30 percent by mass when the PBT resin was charged in the extruder.

Example 10

Particles having significantly cylindrical form were obtained as the resin powder for solid freeform fabrication in the same manner as in Example 1 except that halogen (bromine)-based flame retardant ("NONNEN" PR-2H, manufactured by Marubishi Oil Chemical Corporation) was added in an amount of 10 percent by mass when the PBT resin was charged in the extruder.

Example 11

Particles having significantly cylindrical form were obtained as the resin powder for solid freeform fabrication in the same manner as in Example 1 except that halogen (bromine)-based flame retardant ("NONNEN" PR-2H, manufactured by Marubishi Oil Chemical Corporation) was added in an amount of 0.9 percent by mass when the PBT resin was charged in the extruder.

Example 12

Particles having significantly cylindrical form were obtained as the resin powder for solid freeform fabrication in the same manner as in Example 1 except that halogen (bromine)-based flame retardant ("NONNEN" PR-2H, manufactured by Marubishi Oil Chemical Corporation) was added in an amount of 50 percent by mass when the PBT resin was charged in the extruder.

Example 13

Particles having significantly cylindrical form were obtained as the resin powder for solid freeform fabrication in the same manner as in Example 1 except that halogen (bromine)-based flame retardant ("NONNEN" PR-2H, manufactured by Marubishi Oil Chemical Corporation) in an amount of 10 percent by mass and inorganic hydrated metal compound (antimony trioxide)-based flame retardant (PA-TOX-L, manufactured by Nihon Seiko Co., LTD.) in an amount of 10 percent by mass were added when the PBT resin was charged in the extruder.

Example 14

Particles having significantly cylindrical form were obtained as the resin powder for solid freeform fabrication in the same manner as in Example 1 except that halogen (bromine)-based flame retardant ("NONNEN" PR-2H, manufactured by Marubishi Oil Chemical Corporation) was added in an amount of 60 percent by mass when the PBT resin was charged in the extruder.

Example 15

Particles having significantly cylindrical form were obtained as the resin powder for solid freeform fabrication in the same manner as in Example 3 except that (bromine)-based flame retardant ("NONNEN" PR-2H, manufactured by Marubishi Oil Chemical Corporation) was added when the PA66 resin was charged in an amount of 30 percent by mass in the extruder.

Accuracy, orange peel property, recyclability, and tensile strength were evaluated for those obtained resin powder for solid freeform fabrication in the same manner as in Example 1. Flame retardancy was evaluated as follows. The results are shown in Table 3.

Flame Retardancy 5.0 g of the obtained resin powder for solid freeform fabrication was placed flat on a circular stainless steel mesh (TESTING SIEVE, manufactured by TOKYO SCREEN CO., LTD.) having an opening of 25 μm and a diameter of 10 cm and directly heated from below by a burner. The ignition state was evaluated according to the following criteria.

Evaluation Criteria
A: No ignition after heating for 60 seconds
B: Time to be taken from start of heating until ignition was from 40 to less than 60 second
C: Time to be taken from start of heating until ignition was from 20 to less than 40 second
D: Time to be taken from start of heating until ignition was less than 20 second fabrication. The carbon fiber added had an average fiber diameter of 7 μm and an average fiber length of 130 μm.

Example 17

Carbon fiber (TORAYCA® milled fiber, manufactured by Toray Industries, Inc.) was added in an amount of 30 percent by mass as a toughening agent to the PBT resin powder having a significantly cylindrical form manufactured in Example 1. The mixture was mixed in dry process for 30 minutes by a screw mixer to obtain powder mixture for solid freeform fabrication. The carbon fiber added had an average fiber diameter of 7 μm and an average fiber length of 130 μm.

TABLE 3

| | Resin powder for solid freeform fabrication | Flame retardant | | | Particle Size (Significant cylindrical form: diameter (μm) × height (μm)) (Cuboid: length (μm) × breadth (μm) × height (μm)) | Ratio (diameter or long side/height) | Evaluation Results Flame Retardancy |
|---|---|---|---|---|---|---|---|
| | Material name | Kind | Addition amount (percent by mass) | Form | | | |
| Example 1 | PBT | — | — | Significantly Cylindrical Form | 60 × 80 | 0.75 | D |
| Example 8 | PBT | "Nonnene" PR-2H | 30 | Significantly Cylindrical Form | 60 × 80 | 0.75 | A |
| Example 9 | PBT | "Nonnene" 75 | 30 | Significantly Cylindrical Form | 60 × 80 | 0.75 | A |
| Example 10 | PBT | "Nonnene" PR-2H | 10 | Significantly Cylindrical Form | 60 × 80 | 0.75 | B |
| Example 11 | PBT | "Nonnene" PR-2H | 0.9 | Significantly Cylindrical Form | 60 × 80 | 0.75 | C |
| Example 12 | PBT | "Nonnene" PR-2H | 50 | Significantly Cylindrical Form | 60 × 80 | 0.75 | A |
| Example 13 | PBT | "Nonnene" PR-2H PATOX-L | 10 10 | Significantly Cylindrical Form | 60 × 80 | 0.75 | A |
| Example 14 | PBT | "Nonnene" PR-2H | 60 | Significantly Cylindrical Form | 60 × 80 | 0.75 | A |
| Example 3 | PA66 | — | — | Significantly Cylindrical Form | 60 × 80 | 0.75 | D |
| Example 15 | PA66 | "Nonnene" PR-2H | 30 | Significantly Cylindrical Form | 60 × 80 | 0.75 | A |

Evaluation results on accuracy, orange peel property, recyclability, and tensile strength were the same as those of Examples 1 and 3.

Example 16

60 percent by mass of carbon fiber (TORAYCA® milled fiber, manufactured by Toray Industries, Inc.) was added as a toughening agent to the PBT resin powder having a significantly cylindrical form manufactured in Example 1. The mixture was mixed in dry process for 30 minutes by a screw mixer to obtain powder mixture for solid freeform Example 18

Glass fiber (milled fiber, manufactured by Nippon Electric Glass Co., Ltd.) was added in an amount of 5 percent by mass as a toughening agent to the PBT resin powder having a significantly cylindrical form manufactured in Example 1. The mixture was mixed in dry process for 30 minutes by a screw mixer to obtain powder mixture for solid freeform fabrication. The carbon fiber added had an average fiber diameter of 18 μm and an average fiber length of 150 μm.

Comparative Example 7

Carbon fiber (TORAYCA® milled fiber, manufactured by Toray Industries, Inc.) was added in an amount of 70 percent by mass as a toughening agent to the PBT resin powder having a significantly cylindrical form manufactured in Example 1. The mixture was mixed in dry process for 30 minutes by a screw mixer to obtain powder mixture for solid freeform fabrication. The carbon fiber added had an average fiber diameter of 7 μm and an average fiber length of 130 μm.

Comparative Example 8

Carbon fiber (TORAYCA® milled fiber, manufactured by Toray Industries, Inc.) was added in an amount of 30 percent by mass as a toughening agent to the PBT resin powder having a significantly cylindrical form manufactured in Example 1. The mixture was mixed in dry process for 30 minutes by a screw mixer to obtain powder mixture for solid freeform fabrication. The carbon fiber added had an average fiber diameter of 18 μm and an average fiber length of 400 μm.

Example 19

Glass bead (atomized aluminum powder #245, manufactured by MINALCO LTD.) was added in an amount of 60 percent by mass as a toughening agent to the PBT resin powder having a significantly cylindrical form manufactured in Example 1. The mixture was mixed in dry process for 30 minutes by a screw mixer to obtain powder mixture for solid freeform fabrication. The added glass bead had a volume average particle diameter of 20 μm.

Example 20

Glass bead (atomized aluminum powder #245, manufactured by MINALCO LTD.) was added in an amount of 30 percent by mass as a toughening agent to the PBT resin powder having a significantly cylindrical form manufactured in Example 1. The mixture was mixed in dry process for 30 minutes by a screw mixer to obtain powder mixture for solid freeform fabrication. The added glass bead had a volume average particle diameter of 150 μm.

Example 21

Glass bead (atomized aluminum powder #245, manufactured by MINALCO LTD.) was added in an amount of 20 percent by mass as a toughening agent to the PBT resin powder having a significantly cylindrical form manufactured in Example 1. The mixture was mixed in dry process for 30 minutes by a screw mixer to obtain powder mixture for solid freeform fabrication. The added glass bead had a volume average particle diameter of 60 μm.

Comparative Example 9

Glass bead (atomized aluminum powder #245, manufactured by MINALCO LTD.) was added in an amount of 20 percent by mass as a toughening agent to the PBT resin powder having a significantly cylindrical form manufactured in Example 1. The mixture was mixed in dry process for 30 minutes by a screw mixer to obtain powder mixture for solid freeform fabrication. The added glass bead had a volume average particle diameter of 400 μm.

Comparative Example 10

Carbon fiber (TORAYCA® milled fiber, manufactured by Toray Industries, Inc.) was added in an amount of 30 percent by mass as a toughening agent to the PBT resin powder having a random form manufactured in Comparative Example 1. The mixture was mixed in dry process for 30 minutes by a screw mixer to obtain powder mixture for solid freeform fabrication.

The carbon fiber added had an average fiber diameter of 7 μm and an average fiber length of 130 μm.

Comparative Example 11

Glass bead (glass bead GB190M, manufactured by Potters-Ballotini Co., Ltd.) was added in an amount of 30 percent by mass as a toughening agent to the PBT resin powder having a random form manufactured in Comparative Example 1. The mixture was mixed in dry process for 30 minutes by a screw mixer to obtain powder mixture for solid freeform fabrication. The added glass bead had a volume average particle diameter of 60 μm.

Accuracy, orange peel property, and recyclability were evaluated for those obtained resin powder for solid freeform fabrication in the same manner as in Example 1. Surface roughness was evaluated as follows. The results are shown in Table 4.

The surface roughness Ra of the side plane of the solid freeform fabricated cube was measured according to JIS B 0031 and JIS B 0061. The measuring device was VR3200, manufactured by KEYENCE CORPORATION. In addition, the average of the measuring five times was determined as the experiment value.

TABLE 4

| | Resin Particle | | Toughening agent | | | | Evaluation Results | |
| | | | | | Addition | Ratio | | |
| | Material name | Form | Kind | Form | amount (percent by mass) | (diameter or long side/height) | Surface roughness (Ra) (μm) | Orange Peel Property |
| Example 1 | PBT | Significantly Cylindrical Form | — | — | — | 0.75 | 38 | A |
| Example 16 | PBT | Significantly Cylindrical Form | Carbon fiber | Average fiber diameter 7 μm × average fiber length 130 μm | 60 | 0.75 | 42 | A |

TABLE 4-continued

| | | Resin Particle | | | Toughening agent Addition amount (percent by mass) | Ratio (diameter or long side/height) | Evaluation Results Surface roughness (Ra) (μm) | Orange Peel Property |
|---|---|---|---|---|---|---|---|---|
| | Material name | Form | Kind | Form | | | | |
| Example 17 | PBT | Significantly Cylindrical Form | Carbon fiber | Average fiber diameter 7 μm × average fiber length 130 μm | 30 | 0.75 | 36 | A |
| Example 18 | PBT | Significantly Cylindrical Form | Glass fiber | Average fiber diameter 18 μm × average fiber length 150 μm | 5 | 0.75 | 41 | A |
| Comparative Example 7 | PBT | Significantly Cylindrical Form | Carbon fiber | Average fiber diameter 7 μm × average fiber length 130 μm | 70 | 0.75 | Unable to fabricate | |
| Comparative Example 8 | PBT | Significantly Cylindrical Form | Carbon fiber | Average fiber diameter 18 μm × average fiber length 400 μm | 30 | 0.75 | 122 | B |
| Example 19 | PBT | Significantly Cylindrical Form | Glass bead | Bead diameter 20 μm | 60 | 0.75 | 31 | A |
| Example 20 | PBT | Significantly Cylindrical Form | Glass bead | Bead diameter 150 μm | 30 | 0.75 | 42 | A |
| Example 21 | PBT | Significantly Cylindrical Form | Glass bead | Bead diameter 60 μm | 20 | 0.75 | 39 | A |
| Comparative Example 9 | PBT | Significantly Cylindrical Form | Glass bead | Bead diameter 400 μm | 20 | 0.75 | 94 | B |
| Comparative Example 10 | PBT | Random (frost shattering) | Carbon fiber | Average fiber diameter 7 μm × average fiber length 130 μm | 30 | 0.75 | 88 | B |
| Comparative Example 11 | PBT | Random (frost shattering) | Glass bead | Bead diameter 60 μm | 30 | 0.75 | 91 | B |

Evaluation results on accuracy and recyclability were the same as those of Example 1.

Example 22

The particle having a significantly cylindrical form used in Example 1 was subject to treatment by a spheroidizing device (MP type mixer MP5A/1, manufactured by NIPPON COKE & ENGINEERING. CO., LTD.) at a stirring speed of 9,600 rpm for 20 minutes to obtain a resin powder for solid freeform fabrication. Existence of particles having a pillar-like form with no point at edges was confirmed in the resin powder by a scanning electron microscope (S4200, manufactured by Hitachi, Ltd.) with a magnifying power of 300 times.

Example 23

The particle having a significantly cylindrical form used in Example 2 was subject to spheroidizing treatment in the same manner as in Example 22 to obtain a resin powder for solid freeform fabrication. Existence of particles having a pillar-like form with no point at edges was confirmed in the resin powder by a scanning electron microscope with a magnifying power of 300 times.

Example 24

The particle having a significantly cylindrical form used in Example 3 was subject to spheroidizing treatment in the same manner as in Example 22 to obtain resin powder for solid freeform fabrication. Existence of particles having a pillar-like form with no point at edges was confirmed in the resin powder by a scanning electron microscope with a magnifying power of 300 times.

Example 25

The particle having a significantly cylindrical form used in Example 4 was subject to spheroidizing treatment in the same manner as in Example 22 to obtain a resin powder for solid freeform fabrication. Existence of particles having a pillar-like form with no point at edges was confirmed in the resin powder by a scanning electron microscope with a magnifying power of 300 times.

Example 26

The particle having a significantly cylindrical form used in Example 5 was subject to spheroidizing treatment in the same manner as in Example 22 to obtain a resin powder for solid freeform fabrication. Existence of particles having a pillar-like form with no point at edges was confirmed in the resin powder by a scanning electron microscope with a magnifying power of 300 times.

Example 27

The particle having a significantly cylindrical form used in Example 6 was subject to spheroidizing treatment in the same manner as in Example 22 to obtain a resin powder for solid freeform fabrication. Existence of particles having a pillar-like form with no point at edges was confirmed in the resin powder by a scanning electron microscope with a magnifying power of 300 times.

Example 28

The particle having a significantly cylindrical form used in Example 7 was subject to spheroidizing treatment in the same manner as in Example 22 to obtain a resin powder for solid freeform fabrication. Existence of particles having a pillar-like form with no point at edges was confirmed in the resin powder by a scanning electron microscope with a magnifying power of 300 times.

TABLE 5

| | Particle | | | |
|---|---|---|---|---|
| | Material name | Form | Size (Significant cylindrical form: diameter (μm) × height (μm)) (Cuboid: length (μm) × breadth (μm) × height (μm)) | Ratio (diameter or long side/height) |
| Example 22 | PBT | Significantly Cylindrical Form | 60 × 80 | 0.75 |
| Example 23 | PBT | Cuboid (cube) | 80 × 80 × 80 | 1.00 |
| Example 24 | PA66 | Significantly Cylindrical Form | 60 × 80 | 0.75 |
| Example 25 | PA9T | Significantly Cylindrical Form | 40 × 40 | 1.00 |
| Example 26 | PP | Significantly Cylindrical Form | 60 × 80 | 0.75 |
| Example 27 | PEEK | Significantly Cylindrical Form | 60 × 80 | 0.75 |
| Example 28 | POM | Significantly Cylindrical Form | 60 × 80 | 0.75 |

| | Resin powder for solid freeform fabrication | | | | |
|---|---|---|---|---|---|
| | Melting point (degrees C) | 50 percent cumulative volume particle diameter (μm) | Average Circularity | Specific gravity (g/mL) | Tap Density (g/mL) | Mv/Mn |
| Example 22 | 217 | 68 | 0.87 | 1.36 | 0.76 | 1.16 |
| Example 23 | 217 | 68 | 0.85 | 1.36 | 0.92 | 1.10 |
| Example 24 | 265 | 51 | 0.89 | 1.09 | 0.71 | 1.15 |
| Example 25 | 306 | 41 | 0.86 | 1.4 | 0.73 | 1.20 |
| Example 26 | 130 | 32 | 0.89 | 0.96 | 0.6 | 1.11 |
| Example 27 | 334 | 12 | 0.85 | 1.32 | 0.75 | 1.27 |
| Example 28 | 175 | 23 | 0.88 | 1.41 | 0.81 | 1.23 |

Accuracy, orange peel property, recyclability, and tensile strength were evaluated for those obtained resin powder for solid freeform fabrication in the same manner as in Example 1. The results are shown in Table 6.

TABLE 6

| | Evaluation Results | | | |
|---|---|---|---|---|
| | Accuracy (mm) | Orange Peel Property | Recyclability | Tensile strength (initial value) (MPa) |
| Example 22 | 0.03 | A | A | 63 |
| Example 23 | 0.02 | A | A | 68 |

TABLE 6-continued

| | Evaluation Results | | | |
|---|---|---|---|---|
| | Accuracy (mm) | Orange Peel Property | Recyclability | Tensile strength (initial value) (MPa) |
| Example 24 | 0.01 | A | A | 86 |
| Example 25 | 0.04 | A | A | 170 |
| Example 26 | 0.02 | A | A | 45 |
| Example 27 | 0.03 | A | A | 245 |
| Example 28 | 0.03 | A | A | 78 |

Example 29

The resin powder for solid freeform fabrication obtained in Example 1 in an amount of 20 percent by mass and frost shattered powder (resin powder for solid freeform fabrication) in an amount of 80 percent by mass obtained in Comparative Example 1 were mixed by mazemazeman SKH-40, manufactured by Misugi Co., Ltd., for five minutes and the tap density of the mixture was measured. Using this powder mixture, a solid freeform fabrication object was manufactured by an SLS method fabrication device (AM S5500P, manufactured by Ricoh Company Ltd.). The conditions of the SLS method fabrication device were the same as those for accuracy. Orange peel property of the obtained solid freeform fabrication object was evaluated in the same manner as in Example 1. The results are shown in Table 7.

Example 30

A solid freeform fabrication object was obtained in the same manner as in Example 29 except that 20 percent by mass of the resin powder for solid freeform fabrication obtained in Example 1 was changed to 40 percent by mass and 80 percent by mass of frost shattering powder (resin powder for solid freeform fabrication) obtained in Comparative Example 1 was changed to 60 percent by mass and orange peel property of the powder mixture was evaluated. The results are shown in Table 7.

Example 31

A solid freeform fabrication object was obtained in the same manner as in Example 29 except that 20 percent by mass of the resin powder for solid freeform fabrication obtained in Example 1 was changed to 60 percent by mass and 80 percent by mass of frost shattering powder (resin powder for solid freeform fabrication) obtained in Comparative Example 1 was changed to 40 percent by mass and orange peel property of the powder mixture was evaluated. The results are shown in Table 7.

Example 32

A solid freeform fabrication object was obtained in the same manner as in Example 29 except that 20 percent by mass of the resin powder for solid freeform fabrication obtained in Example 1 was changed to 80 percent by mass and 80 percent by mass of frost shattering powder (resin powder for solid freeform fabrication) obtained in Comparative Example 1 was changed to 20 percent by mass and orange peel property of the powder mixture was evaluated. The results are shown in Table 7.

TABLE 7

| | | Content (percent by mass) | | | Evaluation Results |
|---|---|---|---|---|---|
| | Material name | Pillar-like form particle | Other than pillar-like form particle | Tap Density (g/mL) | Orange Peel Property |
| Example 1 | PBT | 100 | 0 | 0.67 | A |
| Comparative Example 1 | PBT | 0 | 100 | 0.52 | B |
| Example 29 | PBT | 20 | 80 | 0.55 | B |
| Example 30 | PBT | 40 | 60 | 0.58 | A |
| Example 31 | PBT | 60 | 40 | 0.61 | A |
| Example 32 | PBT | 80 | 20 | 0.64 | A |

Aspects of the present disclosure are, for example, as follows.

1. A resin powder for solid freeform fabrication includes a particle having a pillar-like form, wherein the ratio of the height of the particle to the diameter or the long side of the bottom of the particle is 0.5 to 2.0, the particle has a 50 percent cumulative volume particle diameter of from 5 to 200 μm, and the ratio (Mv/Mn) of the volume average particle diameter (Mv) to the number average particle diameter (Mn) of the particle is 2.00 or less.

2. The resin powder according to 1 mentioned above, wherein the particle is a significantly cylindrical form having a bottom having a diameter of from 5 to 200 μm and a height of 5 to 200 μm or the particle is a cuboid having each side of the bottom of from 5 to 200 μm and a height of from 5 to 200 μm.

3. The powder resin according to 1 or 2 mentioned above, wherein the ratio (Mv/Mn) of the volume average particle diameter (Mv) to the number average particle diameter (Mn) is 1.30 or less.

4. The resin powder according to any one of 1 to 3 mentioned above, wherein the resin powder has a specific gravity of from 0.8 g/mL or greater.

5. The resin powder according to any one of 1 to 4 mentioned above, wherein the ratio of the height to the diameter or the long side is from 0.7 to 2.0

6. The resin powder according to any one of 1 to 5, wherein the ratio of the height to the diameter or the long side is 0.8 to 1.5.

7. The resin powder according to any one of 1 to 6 mentioned above, wherein the resin powder has a melting point of 100 degrees C. or higher as measured according to ISO 3146.

8. The resin powder according to any one of 1 to 7 mentioned above, satisfying at least one of the following conditions (1) to (3):

(1): Tmf1>Tmf2 and (Tmf1−Tmf2)≥3 degrees C., where Tmf1 represents a melting starting temperature of an endothermic peak as the resin powder is heated to a temperature 30 degrees C. higher than a melting point of the resin powder at a temperature rising speed of 10 degrees C. per minute for the first time in differential scanning calorimetry measuring according to ISO 3146 and Tmf2 represents a melting starting temperature of an endothermic peak as the resin powder is heated to the temperature 30 degrees C. higher than the melting point at a temperature rising speed of 10 degrees C. per minute for the second time after the resin powder is cooled down to −30 degrees C. or lower at a temperature falling speed of 10 degrees C. per minute after the resin powder is heated for the first time, and both Tmf1 and Tmf2 are measured in differential scanning calorimetry measuring according to ISO 3146. The melting starting temperature of the endothermic peak represents a temperature at a point −15 mW lower from a straight line parallel to X axis drawn from a site where quantity of heat becomes constant after endotherm at the melting point is finished to a lower temperature side, (2): Cd1>Cd2 and (Cd1−Cd2)≥3 percent, where Cd1 represents a crystallinity obtained from an energy amount of the endothermic peak when the resin powder is heated to a temperature 30 degrees C. higher than the melting point of the resin powder at a temperature rising speed of 10 degrees C. per minute for the first time and Cd2 represents a crystallinity obtained from an energy amount of the endothermic peak when the resin powder is heated to the temperature 30 degrees C. higher than the melting point at a temperature rising speed of 10 degrees C. per minute after the resin powder is cooled down to −30 degrees C. or lower at a temperature falling speed of 10 degrees C. per minute after the resin powder is heated for the first time, and both Cd1 and Cd2 are measured in differential scanning calorimetry measuring according to ISO 3146.

(3): C×1>C×2 and (C×1−C×2)≥3 percent, where C×1 represents a crystallinity of the resin powder obtained by X-ray diffraction measuring and C×2 represents a crystallinity obtained by X-ray diffraction measuring when the resin powder is heated to the temperature degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

9. The resin powder according to any one of 1 to 8 mentioned above, wherein the resin powder has a 50 percent cumulative volume particle diameter of from 20 to 70 μm.

10. The resin powder according to any one of 1 to 9 mentioned above, further includes at least one selected from the group consisting of polyolefin, polyamide, polyester, polyarylketone, polyphenylene sulfide, a liquid crystal polymer, polyacetal, polyimide, and a fluorochemical resin.

11. The resin powder according to any one of 1 to 10 mentioned above, wherein polyamide includes at least one member selected from the group consisting of polyamide 410, polyamide 4T, polyamide 6, polyamide 66, polyamide MXD6, polyamide 610, polyamide 6T, polyamide 11, polyamide 12, polyamide 9T, polyamide 10T, and aramid, all of which include aromatic polyamide.

12. The resin powder according to 10 or 11, wherein polyester includes at least one member selected from the group consisting of polyethylene terephthalate, polybutylene terephthalate, and polylactate.

13. The resin powder according to any one of 10 to 12 mentioned above, wherein polyaryl ketone includes at least one member selected from the group consisting of polyether ether ketone, polyether ketone, and polyether ketone ketone.

14. The resin powder according to any one of 1 to 13 mentioned above, wherein the resin powder has a bulk density of 0.35 g/mL or greater.

15. The resin powder according to 14 mentioned above, wherein the resin powder has a specific gravity of from 0.4 g/mL or greater.

16. The resin powder according to 15 mentioned above, wherein the resin powder has a bulk density of from 0.8 g/mL or greater.

17. The resin powder according to any one of 1 to 16 mentioned above, further includes a fluidizer.

18. The resin powder according to 17 mentioned above, wherein the fluidizer has a proportion of from 0.1 to 10 percent by mass.

19. The resin powder according to 17 or 18 mentioned above, wherein the fluidizer material has a volume average particle diameter of less than 10 micrometer.

20. The resin powder according to any one of 1 to 19 mentioned above, further includes a toughening agent.

21. The resin powder according to any one of 1 to 20, wherein the resin powder has an average circularity of 0.83 in a range of the particle diameter of from 0.5 to 200 μm.

22. The resin powder according to any one of 1 to 21 mentioned above, further includes a toughening agent.

23. The resin powder according to any one of 1 to 22 mentioned above, further includes a flame retardant.

24. The resin powder according to any one of 1 to 23 mentioned above, wherein the particle having a pillar-like form accounts for 30 percent by mass or more.

25. A device for manufacturing a solid freeform fabrication object includes a layer forming device to form a layer including the resin powder of any one of 1 to 24 mentioned above and a powder attaching device to attach resin powder in a selected area of the layer.

26. A method of manufacturing a solid freeform fabrication object includes forming a layer including the resin powder of any one of 1 to 24 mentioned above and irradiating the layer with electromagnetic wave to melt the layer, cooling down the layer to cure the layer, and repeating the forming, the irradiating, the cooling down, and the curing.

27. The method according to 26 mentioned above, wherein the electromagnetic wave irradiation source is at least one member selected from the group consisting of $CO_2$ laser, infra red irradiation source, a microwave generator, a radiant heater, and a LED lamp.

28. A solid freeform fabrication object manufactured by the method of manufacturing a solid freeform fabrication object according to 26 or 27 mentioned above.

According to the present disclosure, resin powder for solid freeform fabrication is provided which has excellent recyclability, can be packed more densely, enhances tensile strength and orange peel property of obtained solid freeform fabrication objects, and is capable of easily and efficiently manufacturing complicated and fine solid freeform fabrication objects.

Having now fully described embodiments of the present disclosure, it will be apparent to one of ordinary skill in the art that many changes and modifications can be made thereto without departing from the spirit and scope of embodiments of the disclosure as set forth herein.

What is claimed is:

1. A resin powder for solid freeform fabrication comprising:
    a particle having a pillar-like form,
    wherein a ratio of a height of the particle to a diameter or a long side of a bottom of the particle is 0.5 to 2.0,
    wherein the particle has a 50 percent cumulative volume particle diameter of from 5 to 200 μm,
    wherein a ratio (Mv/Mn) of a volume average particle diameter (Mv) to a number average particle diameter (Mn) of the particle is 2.00 or less, and
    wherein the resin powder has an average circularity of 0.83 or greater in a range in which the resin powder has a particle diameter of from 0.5 to 200 μm.

2. The resin powder according to claim 1, wherein the particle is a significantly cylindrical form having a bottom having a diameter of from 5 to 200 μm and a height of 5 to 200 μm or the particle is a cuboid having each side of a bottom of from 5 to 200 μm and a height of from 5 to 200 μm.

3. The resin powder according to claim 1, wherein the ratio (Mv/Mn) is 1.30 or less.

4. The resin powder according to claim 1, wherein the resin powder has a specific gravity of 0.8 g/mL or greater.

5. The resin powder according to claim 1, wherein the ratio of the height to the diameter or the long side is 0.7 to 2.0.

6. The resin powder according to claim 1, wherein the resin powder has a melting point of 100 degrees C. or higher as measured according to ISO 3146.

7. The resin powder according to claim 1, satisfying at least one of the following relations (1) to (3):

(1): Tmf1>Tmf2 and (Tmf1−Tmf2)≥3 degrees C., where Tmf1 represents a melting starting temperature of an endothermic peak as the resin powder is heated to a temperature 30 degrees C. higher than a melting point of the resin powder at a temperature rising speed of 10 degrees C. per minute for a first time and Tmf2 represents a melting starting temperature of an endothermic peak as the resin powder is heated for the first time, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both Tmf1 and Tmf2 are measured in differential scanning calorimetry measuring according to ISO 3146, wherein the melting starting temperature of the endothermic peak represents a temperature at a point −15 mW lower from a straight line parallel to X axis drawn from a site where quantity of heat becomes constant after endotherm at the melting point is finished to a lower temperature side, (2): Cd1>Cd2 and (Cd1−Cd2)≥3 percent, where Cd1 represents a crystallinity obtained from an energy amount of the endothermic peak when the resin powder is heated to a temperature 30 degrees C. higher than the melting point of the resin powder at a temperature rising speed of 10 degrees C. per minute for a first time and Cd2 represents a crystallinity obtained from an energy amount of the endothermic peak as the resin powder is heated for the first time, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both Cd1 and Cd2 are measured in differential scanning calorimetry measuring according to ISO 3146, and (3): Cx1>Cx2 and (Cx1−Cx2)≥3 percent, where Cx1 represents a crystallinity of the resin powder obtained by X-ray diffraction measuring and Cx2 represents a crystallinity obtained by X-ray diffraction measuring as the resin powder is heated to the temperature 30 degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

8. The resin powder according to claim 1, wherein the resin powder has a 50 percent cumulative volume particle diameter of from 20 to 70 μm.

9. The resin powder according to claim 1, further comprising at least one member selected from the group consisting of polyolefin, polyamide, polyester, polyarylketone, polyphenylene sulfide, a liquid crystal polymer, polyacetal, polyimide, and a fluorochemical resin.

10. The resin powder according to claim 9, wherein polyamide includes at least one member selected from the group including aromatic polyamide consisting of polyamide 410, polyamide 4T, polyamide 6, polyamide 66, polyamide MXD6, polyamide 610, polyamide 6T, polyamide 11, polyamide 12, polyamide 9T, polyamide 10T, and aramid.

11. The resin powder according to claim 9, wherein polyester includes at least one member selected from the group consisting of polyethylene terephthalate, polybutylene terephthalate, and polylactate.

12. The resin powder according to claim 9, wherein polyaryl ketone includes at least one member selected from the group consisting of polyether ether ketone, polyether ketone, and polyether ketone ketone.

13. The resin powder according to claim 1, further comprising a toughening agent.

14. The resin powder according to claim 1, further comprising a flame retardant.

15. The resin powder according to claim 1, wherein the particle having a pillar-like form accounts for 30 percent by mass or more of the resin powder.

16. A device for manufacturing a solid freeform fabrication object, comprising:
    a layer forming device configured to form a layer including the resin powder of claim 1; and
    a powder attaching device configured to attach the resin powder to each other in a selected area of the layer.

17. A method of manufacturing a solid freeform fabrication object, comprising:
    forming a layer including the resin powder of claim 1;
    irradiating the layer with electromagnetic wave to melt the layer;
    cooling down the layer;
    curing the layer; and
    repeating the forming, the irradiating, the cooling down, and the curing the layer.

* * * * *